US011461858B2

(12) United States Patent
Fujita

(10) Patent No.: US 11,461,858 B2
(45) Date of Patent: Oct. 4, 2022

(54) INFORMATION PROCESSING DEVICE, INFORMATION PROCESSING METHOD, AND PROGRAM

(71) Applicant: SONY CORPORATION, Tokyo (JP)

(72) Inventor: Takuya Fujita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 499 days.

(21) Appl. No.: 15/569,121

(22) PCT Filed: Mar. 24, 2016

(86) PCT No.: PCT/JP2016/059512
§ 371 (c)(1),
(2) Date: Oct. 25, 2017

(87) PCT Pub. No.: WO2016/199474
PCT Pub. Date: Dec. 15, 2016

(65) Prior Publication Data
US 2018/0101917 A1 Apr. 12, 2018

(30) Foreign Application Priority Data

Jun. 10, 2015 (JP) .............................. JP2015-117660

(51) Int. Cl.
*G06Q 50/16* (2012.01)
*G06F 16/29* (2019.01)
(Continued)

(52) U.S. Cl.
CPC ............. *G06Q 50/16* (2013.01); *G06F 16/29* (2019.01); *G06F 21/62* (2013.01); *G06F 21/6245* (2013.01); *G06Q 30/0627* (2013.01)

(58) Field of Classification Search
CPC .. G06Q 50/16; G06Q 30/0627; G06Q 50/163; G06F 16/29; G06F 21/62; G06F 21/6254
(Continued)

(56) References Cited

U.S. PATENT DOCUMENTS

2004/0015434 A1* 1/2004 McCue .............. G06Q 30/0601
705/26.1
2004/0030603 A1* 2/2004 Grundfest .......... G06Q 30/0601
705/26.1
(Continued)

FOREIGN PATENT DOCUMENTS

CN 101464988 A 6/2009
CN 101467170 A 6/2009
(Continued)

OTHER PUBLICATIONS

Charles Corcoran, Fei Liu, Accuracy of Zillow's Home Value Estimates, 2014, Real Estate Issues, vol. 39, No. 1, pp. 45-49. (Year: 2014).*

(Continued)

*Primary Examiner* — Jeffrey A. Smith
*Assistant Examiner* — Brittany E Bargeon
(74) *Attorney, Agent, or Firm* — Xsensus LLP

(57) ABSTRACT

[Object] To provide an information processing device, a control method, and a program capable of revitalizing real estate transactions while also protecting supplier-side privacy pertaining to real estate transactions.

[Solution] An information processing device including: an alteration unit that alters a granularity of real estate information to be disclosed, in accordance with a supplier-side privacy disclosure level pertaining to a real estate transaction; and a decision unit that decides an evaluation value of real estate information altered by the alteration unit.

19 Claims, 20 Drawing Sheets

(51) Int. Cl.
*G06F 21/62* (2013.01)
*G06Q 30/06* (2012.01)

(58) Field of Classification Search
USPC .................................................. 705/26.63
See application file for complete search history.

(56) References Cited

U.S. PATENT DOCUMENTS

| | | | | |
|---|---|---|---|---|
| 2005/0273346 A1* | 12/2005 | Frost | ............... | G06Q 50/167 705/26.1 |
| 2007/0043770 A1* | 2/2007 | Goodrich | ............ | G06F 3/04817 |
| 2007/0106523 A1 | 5/2007 | Eaton et al. | | |
| 2007/0143173 A1* | 6/2007 | Walker | ............... | G06Q 50/16 705/313 |
| 2008/0154740 A1* | 6/2008 | Lee | ............... | G06Q 30/0623 705/26.1 |
| 2008/0154774 A1* | 6/2008 | Dennison | ............ | H04L 63/083 705/51 |
| 2009/0012874 A1* | 1/2009 | Case | ............... | G06Q 30/0617 705/26.42 |
| 2009/0254971 A1* | 10/2009 | Herz | ............... | G06Q 10/10 726/1 |
| 2010/0131331 A1 | 5/2010 | Ginsburg et al. | | |
| 2011/0196762 A1* | 8/2011 | DuPont | ............... | G06Q 10/10 705/306 |
| 2012/0158748 A1* | 6/2012 | Smintina | ............ | G06Q 50/16 707/748 |
| 2012/0265633 A1* | 10/2012 | Wohlstadter | .......... | G06Q 40/00 709/206 |
| 2012/0330714 A1* | 12/2012 | Malaviya | .......... | G06Q 10/0635 705/7.29 |
| 2013/0041841 A1 | 2/2013 | Lyons | | |
| 2013/0332374 A1* | 12/2013 | Hartnett | ............... | G06Q 50/16 705/313 |
| 2013/0332877 A1* | 12/2013 | Florance | ............. | G06Q 50/163 715/781 |
| 2014/0258285 A1* | 9/2014 | Lavine | ............... | G06F 16/248 707/728 |
| 2015/0052080 A1* | 2/2015 | Letzeiser | ............. | G06Q 50/163 705/36 R |
| 2016/0048934 A1* | 2/2016 | Gross | ............... | G06Q 30/0643 705/313 |
| 2019/0005516 A1* | 1/2019 | Spath | ............... | G06Q 30/0201 |
| 2019/0272551 A1* | 9/2019 | Shariff | ............... | G06Q 30/0261 |

FOREIGN PATENT DOCUMENTS

| | | |
|---|---|---|
| JP | 11-7468 A | 1/1999 |
| JP | 2002-312459 A | 10/2002 |
| JP | 2003-281252 A | 10/2003 |
| JP | 2011-209800 A | 10/2011 |
| JP | 2013-190838 A | 9/2013 |
| WO | 2007/142494 A1 | 12/2007 |
| WO | 2014/054381 A1 | 4/2014 |

OTHER PUBLICATIONS

Extended European Search Report dated Jan. 10, 2019, issued in corresponding European Patent Application No. 16807181.
International Search Report dated Jun. 7, 2016 in PCT/JP2016/059512, 2 pages.
Chinese Office Action dated Oct. 19, 2021, in corresponding Chinese Patent Application No. 201680032019.1.

* cited by examiner

FIG. 5

DISCLOSED PROPERTY INFORMATION SETTING SCREEN

■ PLEASE INPUT PROPERTY INFORMATION.

| | | | |
|---|---|---|---|
| LOCATION | 000-555 4-CHOME, NISHI-SHINJUKU SHINJUKU-KU, TOKYO | MINUTES ON FOOT [MIN] | 3 |
| APARTMENT NAME | AAA TOWER | FLOOR NUMBER [FLOOR] | 11 |
| ROOM NUMBER | 1105 | SELLING PRICE [MILLION YEN] | 33 |
| EXCLUSIVELY-OWNED AREA [m²] | 37.1 | | |
| LAYOUT | 1LDK | | |
| AGE [YEARS] | 15 | | |

NEXT

FIG. 6

DISCLOSED PROPERTY INFORMATION SETTING SCREEN — 1200

■ PLEASE INPUT INFORMATION TO DISCLOSE.

| | |
|---|---|
| LOCATION | 000-555 4-CHOME, NISHI-SHINJUKU, SHINJUKU-KU, TOKYO |
| APARTMENT NAME | AAA TOWER |
| ROOM NUMBER | 1105 |
| EXCLUSIVELY-OWNED AREA [m²] | 37.1 ~ 37.1 |
| LAYOUT | 1LDK |
| AGE [YEARS] | 15 ~ 15 |
| MINUTES ON FOOT [MIN] | 3 ~ 3 |
| FLOOR NUMBER [FLOOR] | 11 ~ 11 |
| SELLING PRICE [MILLION YEN] | 33 |

— 1201

◇ PREDICTED CONTRACT PRICE — 35 MILLION YEN (1202)

◇ PREDICTED TIME TO CONTRACT
- WITHIN 1 MONTH — 50% (1203-1)
- WITHIN 2 MONTHS — 70% (1203-2)
- WITHIN 3 MONTHS — 85% (1203-3)

◇ NUMBER OF MATCHING PROPERTIES (ANONYMITY LEVEL)
THE NUMBER OF PROPERTIES MATCHING THE DISCLOSED INFORMATION ON THE LEFT IS [1] — 1204

[ ADJUST ANONYMITY LEVEL ] — 1205

FIG. 9
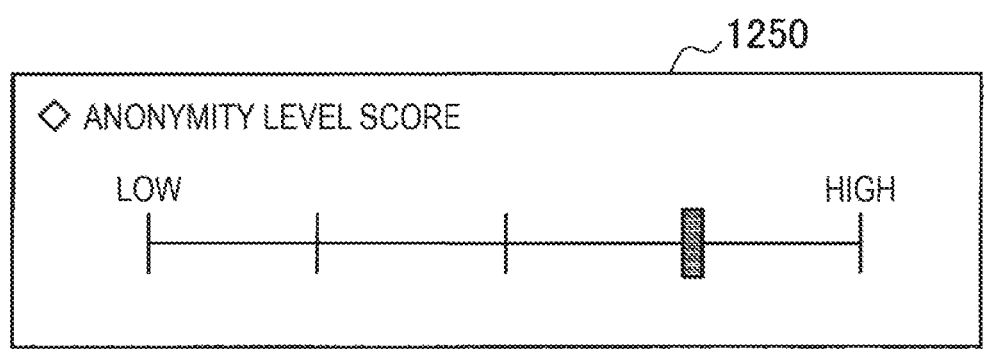
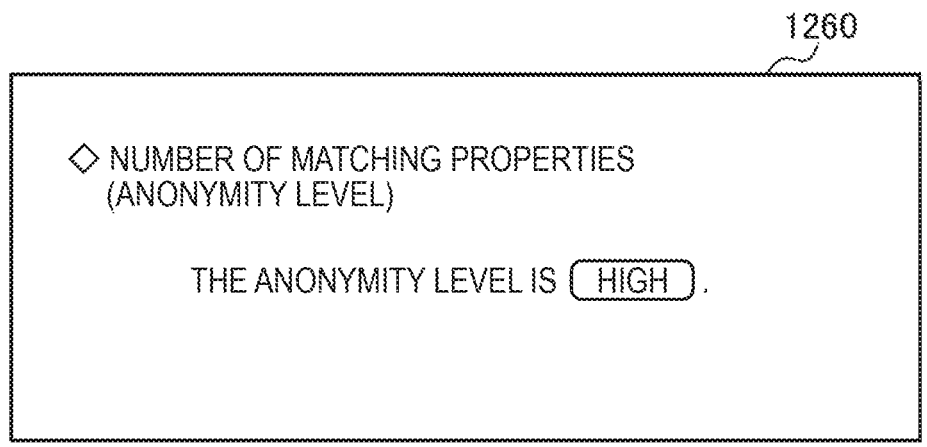

FIG. 10
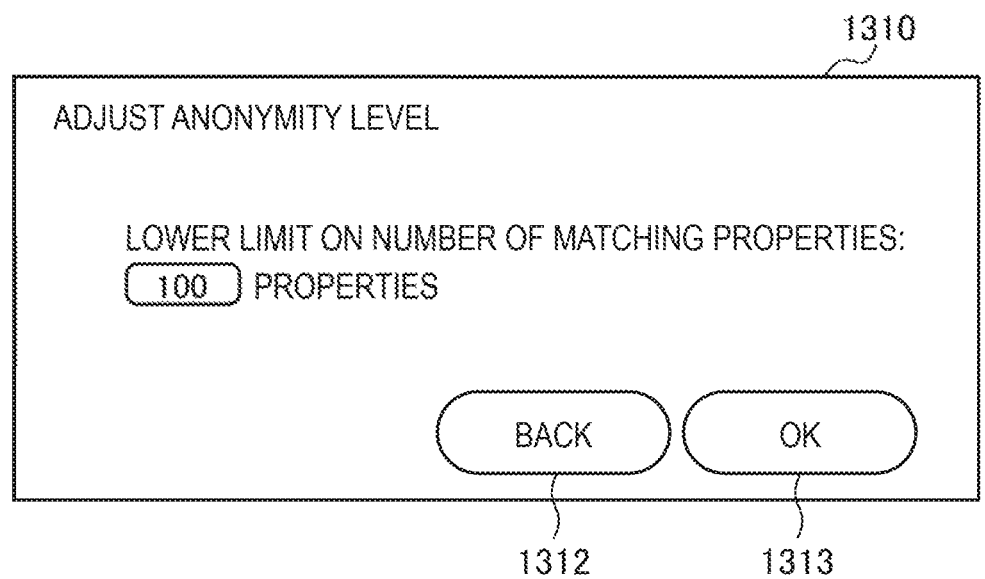
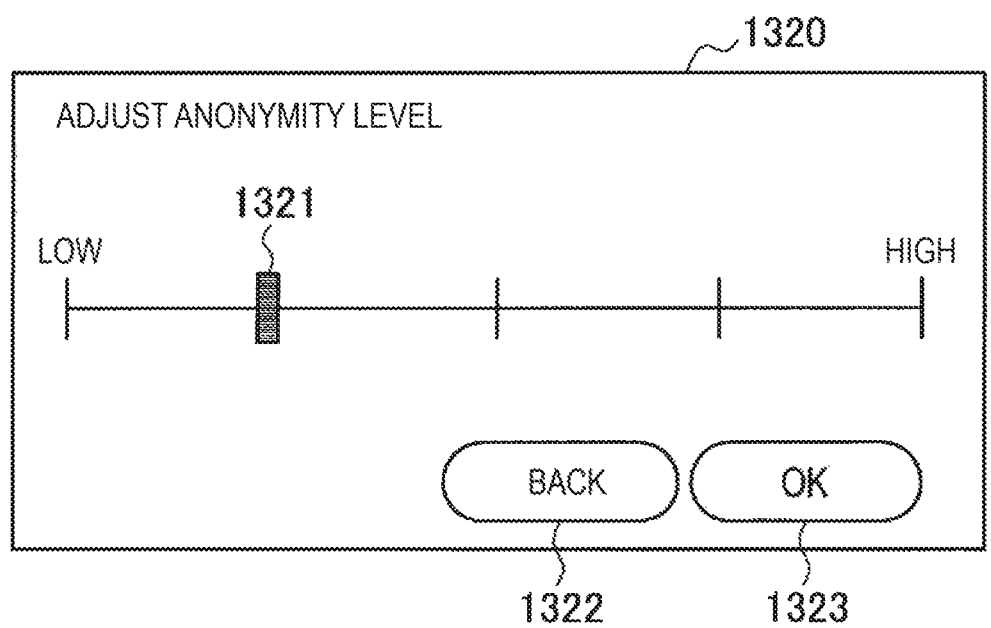

FIG. 11

DISCLOSED PROPERTY INFORMATION SETTING SCREEN

■ PLEASE INPUT INFORMATION TO DISCLOSE.

| LOCATION | 4-CHOME, NISHI-SHINJUKU, SHINJUKU-KU, TOKYO |
| --- | --- |
| APARTMENT NAME | |
| ROOM NUMBER | |
| EXCLUSIVELY-OWNED AREA [m²] | 30 ~ 40 |
| LAYOUT | 1LDK |
| AGE [YEARS] | 13 ~ 17 |
| MINUTES ON FOOT [MIN] | ~ 5 |
| FLOOR NUMBER [FLOOR] | 10 ~ |
| SELLING PRICE [MILLION YEN] | 33 |

◇ PREDICTED CONTRACT PRICE: 34 MILLION YEN (1402)

◇ PREDICTED TIME TO CONTRACT:
- WITHIN 1 MONTH: 45% (1403-1)
- WITHIN 2 MONTHS: 65% (1403-2)
- WITHIN 3 MONTHS: 75% (1403-3)

◇ NUMBER OF MATCHING PROPERTIES (ANONYMITY LEVEL)
THE NUMBER OF PROPERTIES MATCHING THE DISCLOSED INFORMATION ON THE LEFT IS 107 (1404)

[ADJUST ANONYMITY LEVEL] (1405)

DISCLOSED PROPERTY INFORMATION SETTING SCREEN

■ PLEASE INPUT INFORMATION TO DISCLOSE.

| LOCATION | 4-CHOME, NISHI-SHINJUKU, SHINJUKU-KU, TOKYO |
|---|---|
| APARTMENT NAME | |
| ROOM NUMBER | |
| EXCLUSIVELY-OWNED AREA [m²] | 30 ~ 40 |
| LAYOUT | |
| AGE [YEARS] | 13 ~ 17 |
| MINUTES ON FOOT [MIN] | ~ 5 |
| FLOOR NUMBER [FLOOR] | |
| SELLING PRICE [MILLION YEN] | ~ 33 |

◇ PREDICTED CONTRACT PRICE    33 MILLION YEN

◇ PREDICTED TIME TO CONTRACT
 WITHIN 1 MONTH    40%
 WITHIN 2 MONTHS   60%
 WITHIN 3 MONTHS   70%

◇ NUMBER OF MATCHING PROPERTIES (ANONYMITY LEVEL)
 THE NUMBER OF PROPERTIES MATCHING THE DISCLOSED INFORMATION ON THE LEFT IS   273

( ADJUST ANONYMITY LEVEL )

FIG. 13

DISCLOSED PROPERTY INFORMATION SETTING SCREEN

■ PLEASE INPUT INFORMATION TO DISCLOSE.

| | |
|---|---|
| LOCATION | 000-555 4-CHOME, NISHI-SHINJUKU, SHINJUKU-KU, TOKYO |
| APARTMENT NAME | AAA TOWER |
| ROOM NUMBER | |
| EXCLUSIVELY-OWNED AREA [m2] | 37.1 |
| LAYOUT | |
| AGE [YEARS] | 15 |
| MINUTES ON FOOT [MIN] | 3 |
| FLOOR NUMBER [FLOOR] | 11 ~ 11 |
| SELLING PRICE [MILLION YEN] | 33 |

◇ PREDICTED CONTRACT PRICE — 35 MILLION YEN

◇ PREDICTED WITHIN 1 MONTH — 50%
— 70%
— 85%

ALTERATION CANDIDATES — 1600

| | | |
|---|---|---|
| ☐ MINUTES ON FOOT [MIN] | 15 ~ 20 |
| ☐ MINUTES BY BICYCLE [MIN] | 7 ~ 9 |
| ☑ MINUTES BY CAR [MIN] | 3 ~ 4 |
| ☐ DISTANCE TO STATION | FAR |

( ADJUST ANONYMITY LEVEL )

FIG. 14

DISCLOSED PROPERTY INFORMATION SETTING SCREEN

■ PLEASE INPUT INFORMATION TO DISCLOSE.

| Field | Value | Anonymity Level |
|---|---|---|
| LOCATION | 4-CHOME, NISHI-SHINJUKU, SHINJUKU-KU, TOKYO | 3.73 |
| APARTMENT NAME | | 5.98 |
| ROOM NUMBER | | 6.98 |
| EXCLUSIVELY-OWNED AREA [m²] | 30 ~ 40 | 5.89 |
| LAYOUT | | 6.29 |
| AGE [YEARS] | 13 ~ 17 | 5.88 |
| MINUTES ON FOOT [MIN] | ~ 5 | 6.63 |
| FLOOR NUMBER [FLOOR] | | 6.07 |
| SELLING PRICE [MILLION YEN] | 33 | |

◇ PREDICTED CONTRACT PRICE
　34 MILLION YEN

◇ PREDICTED TIME TO CONTRACT
　WITHIN 1 MONTH　45%
　WITHIN 2 MONTHS　65%
　WITHIN 3 MONTHS　75%

◇ NUMBER OF MATCHING PROPERTIES (ANONYMITY LEVEL)
　THE NUMBER OF PROPERTIES MATCHING THE DISCLOSED INFORMATION ON THE LEFT IS 107.

(ADJUST ANONYMITY LEVEL)

FIG. 15

DISCLOSED PROPERTY INFORMATION SETTING SCREEN

■ PLEASE INPUT INFORMATION TO DISCLOSE.

| | | NUMBER OF MATCHING PROPERTIES | |
|---|---|---|---|
| LOCATION | 4-CHOME, NISHI-SHINJUKU, SHINJUKU-KU, TOKYO | 5,409 | |
| APARTMENT NAME | | - | 5,409 |
| ROOM NUMBER | | - | 5,409 |
| EXCLUSIVELY-OWNED AREA [m²] | 30 ~ 40 | 436 | 5,409 |
| LAYOUT | 1LDK | 1,097 | 5,409 |
| AGE [YEARS] | 13 ~ 17 | 426 | 5,409 |
| MINUTES ON FOOT [MIN] | ~ 5 | 2,410 | 5,409 |
| FLOOR NUMBER [FLOOR] | 10 ~ | 661 | 5,409 |
| SELLING PRICE [MILLION YEN] | 33 | | |

◇ PREDICTED CONTRACT PRICE
   34 MILLION YEN

◇ PREDICTED TIME TO CONTRACT
   WITHIN 1 MONTH   45%
   WITHIN 2 MONTHS  85%
   WITHIN 3 MONTHS  75%

◇ NUMBER OF MATCHING PROPERTIES (ANONYMITY LEVEL)
   THE NUMBER OF PROPERTIES MATCHING THE DISCLOSED INFORMATION ON THE LEFT IS [107]

(ADJUST ANONYMITY LEVEL)

DISCLOSED PROPERTY INFORMATION SETTING SCREEN — 1900

■ PLEASE INPUT INFORMATION TO DISCLOSE.

| Field | Value | | | Degree of contribution to contract price |
|---|---|---|---|---|
| LOCATION | 4-CHOME, NISHI-SHINJUKU, SHINJUKU-KU, TOKYO | | | 9.1 |
| APARTMENT NAME | AAA TOWER | | | 3.7 |
| ROOM NUMBER | 1105 | | | 2.8 |
| EXCLUSIVELY-OWNED AREA [m²] | 37.1 | ~ | 37.1 | 9.4 |
| LAYOUT | 1LDK | | | 5.3 |
| AGE [YEARS] | 15 | ~ | 15 | 7.4 |
| MINUTES ON FOOT [MIN] | 3 | ~ | 3 | 5.2 |
| FLOOR NUMBER [FLOOR] | 11 | ~ | 11 | |
| SELLING PRICE [MILLION YEN] | 33 | | | 2.7 |

— 1901, 1906

◇ PREDICTED CONTRACT PRICE

35 MILLION YEN

◇ PREDICTED TIME TO CONTRACT

WITHIN 1 MONTH — 50%
  WITHIN 2 MONTHS — 70%
  WITHIN 3 MONTHS — 85%

◇ NUMBER OF MATCHING PROPERTIES (ANONYMITY LEVEL)

THE NUMBER OF PROPERTIES MATCHING THE DISCLOSED INFORMATION ON THE LEFT IS [ 1 ]

( ADJUST ANONYMITY LEVEL )

FIG. 17

DISCLOSED PROPERTY INFORMATION SETTING SCREEN ~2000

■ PLEASE INPUT INFORMATION TO DISCLOSE.

| Field | Value | | Degree of contribution to contract price |
|---|---|---|---|
| LOCATION | 4-CHOME, NISHI-SHINJUKU, SHINJUKU-KU, TOKYO | | 9.1 |
| APARTMENT NAME | | | 3.7 |
| ROOM NUMBER | | | 2.8 |
| EXCLUSIVELY-OWNED AREA [m²] | 36 ~ 39 | | 9.4 |
| LAYOUT | 1LDK | | 5.3 |
| AGE [YEARS] | 14 ~ 16 | | 7.4 |
| MINUTES ON FOOT [MIN] | 3 ~ 7 | | 5.2 |
| FLOOR NUMBER [FLOOR] | | 30 | 2.7 |
| SELLING PRICE [MILLION YEN] | 33 | | |

~2001   ~2006

◇ PREDICTED CONTRACT PRICE
　　34 MILLION YEN

◇ PREDICTED TIME TO CONTRACT
　　WITHIN 1 MONTH　45%
　　WITHIN 2 MONTHS　65%
　　WITHIN 3 MONTHS　75%

◇ NUMBER OF MATCHING PROPERTIES (ANONYMITY LEVEL)
　　THE NUMBER OF PROPERTIES MATCHING THE DISCLOSED INFORMATION ON THE LEFT IS 100
　　( ADJUST ANONYMITY LEVEL )

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

Recently, even in real estate transactions, actions such as information searches and correspondence related to transactions often are being performed over a network such as the Internet. For example, Patent Literature 1 describes a technology that acquires user information and real estate information saved on a server, based on a user identifier and a real estate identifier input into a client, and creates an inspection invitation on which the acquired user information and real estate information are filled in.

CITATION LIST

Patent Literature

Patent Literature 1: JP 2003-281252A

DISCLOSURE OF INVENTION

Technical Problem

However, with technology like that described in Patent Literature 1, for example, information related to a property (such as the location, floor number, exterior photos, and the time from the closest station on foot or by bus) is disclosed to users attempting to purchase or rent real estate, and there is a risk of the target property being identified. From the perspective of the selling or lending side, the information of selling or renting out a property is privacy-related, and there is resistance to such information being known. Also, privacy concerns keep sellers and lessors from entering the market, thereby hindering brisk and active real estate transactions.

Technology that provides real estate information with consideration for such privacy of the selling or lending side (in other words, the real estate supplier side) has not yet been sufficiently proposed.

Accordingly, the present disclosure proposes an information processing device, an information processing method, and a program capable of revitalizing real estate transactions while also protecting supplier-side privacy pertaining to real estate transactions.

Solution to Problem

According to the present disclosure, there is proposed an information processing device including: an alteration unit that alters a granularity of real estate information to be disclosed, in accordance with a supplier-side privacy disclosure level pertaining to a real estate transaction; and a decision unit that decides an evaluation value of real estate information altered by the alteration unit.

According to the present disclosure, there is proposed an information processing method, executed by a processor, including: altering a granularity of real estate information to be disclosed, in accordance with a supplier-side privacy disclosure level pertaining to a real estate transaction; and deciding an evaluation value of the altered real estate information.

According to the present disclosure, there is proposed a program causing a computer to function as: an alteration unit that alters a granularity of real estate information to be disclosed, in accordance with a supplier-side privacy disclosure level pertaining to a real estate transaction; and a decision unit that decides an evaluation value of real estate information altered by the alteration unit.

Advantageous Effects of Invention

According to the present disclosure as described above, it is possible to revitalize real estate transactions while also protecting supplier-side privacy pertaining to real estate transactions.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating an example of a property information input screen displayed in the present embodiment.

FIG. 6 is a diagram illustrating an example of a disclosed property information setting screen displayed in the present embodiment.

FIG. 9 is a diagram illustrating an example of a case of converting and displaying an anonymity level as a symbol according to the present embodiment.

FIG. 10 is a diagram illustrating an example of an anonymity level adjustment screen according to the present embodiment.

FIG. 11 is a diagram illustrating an example of disclosed information altered in accordance with an anonymity level according to the present embodiment.

FIG. 12 is a diagram illustrating an example of a presentation screen in a case in which information about the layout and floor number of a property has been altered to private manually by a user according to the present embodiment.

FIG. 13 is a diagram illustrating an example of a screen presentation in a case of automatically presenting alteration candidates according to the present embodiment.

FIG. 14 is a diagram illustrating an example of a screen presentation which an anonymity level score is displayed for each item of property information according to the present embodiment.

FIG. 15 is a diagram illustrating an example of a screen presentation in which an anonymity level of the number of matching properties is displayed for each item of property information according to the present embodiment.

FIG. 16 is a diagram illustrating an example of a screen presentation in which a degree of contribution to the contract price is displayed for each item of property information according to the present embodiment.

FIG. 17 is a diagram illustrating an example of a screen presentation in a case in which a user manually alters property information in consideration of the degree of contribution to the contract price according to the present embodiment.

MODE(S) FOR CARRYING OUT THE INVENTION

Figure 1:
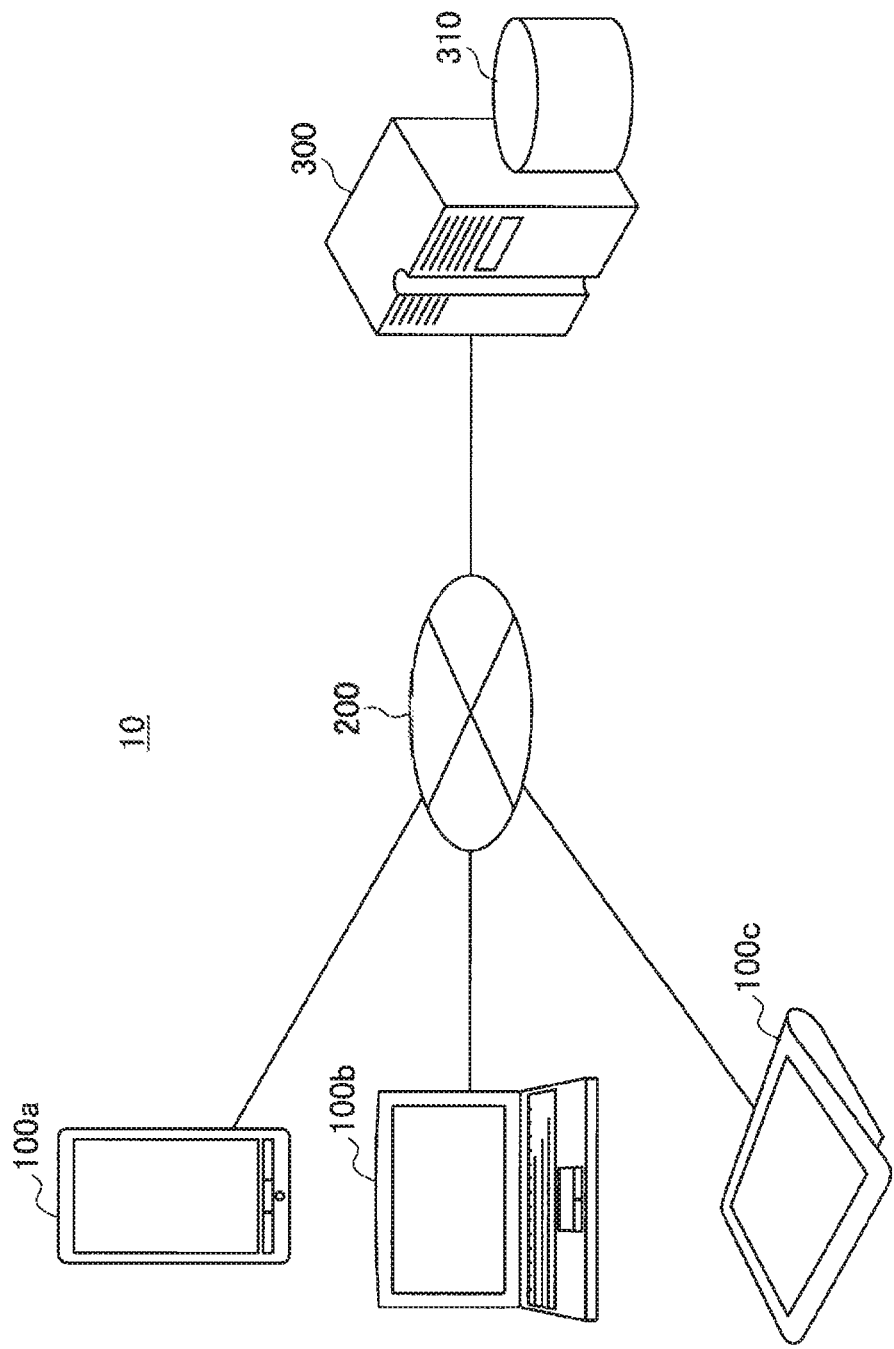
FIG. 1 is a diagram illustrating a diagrammatic configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.

1. Summary of system according to an embodiment of the present disclosure
  1-1. Configuration of client
  1-2. Configuration of server
2. Functional configuration
3. Real estate information presentation process
4. Example of real estate information presentation screen
5. Hardware configuration
6. Supplemental remarks
7. Conclusion <<1. Summary of System According to an Embodiment of the Present Disclosure>>

FIG. 1 is a diagram illustrating a diagrammatic configuration of a system according to an embodiment of the present disclosure. Referring to FIG. 1, a system 10 according to the present embodiment includes a client 100 and a server 300. The client 100 and the server 300 are connected by a network 200, and are able to communicate with each other.

The client 100 may include devices such as a smartphone 100a, a personal computer 100b, and a tablet 100c, for example. The client 100 is not limited to the illustrated example, and may include any type of terminal device having a function of inputting and outputting information with respect to a user. To output information to a user, the client 100 uses images, sound, and the like, for example. Additionally, the client 100 may accept the input of information from the user through operating input on the terminal device, sound indicating speech, an image indicating a gesture or line of sight, or the like.

The server 300 includes one or multiple server devices on a network. In the case of realizing the functions of the server 300 described hereinafter by having multiple server devices act cooperatively, the totality of the multiple server devices may be treated as a single information processing device. Alternatively, at least some of the server devices may be run by an operator different from the operator of the server 300 described hereinafter. In such a case, in the following description, part of the server 300 may be referred to as an external server not included in the system 10. In the present embodiment, at least one or some of the server devices include a database 310. The database 310 stores information related to real estate and transaction histories thereof.

The network 200 includes any of various types of wired or wireless networks, such as the Internet, a local area network (LAN), or a mobile phone network, for example. The network 200 connects the client 100 and the server 300, and may also connect multiple server devices included in the server 300. In cases in which multiple types of networks are included in the network 200, the network 200 may also include devices such as routers and hubs that interconnect such networks.

Figure 2:
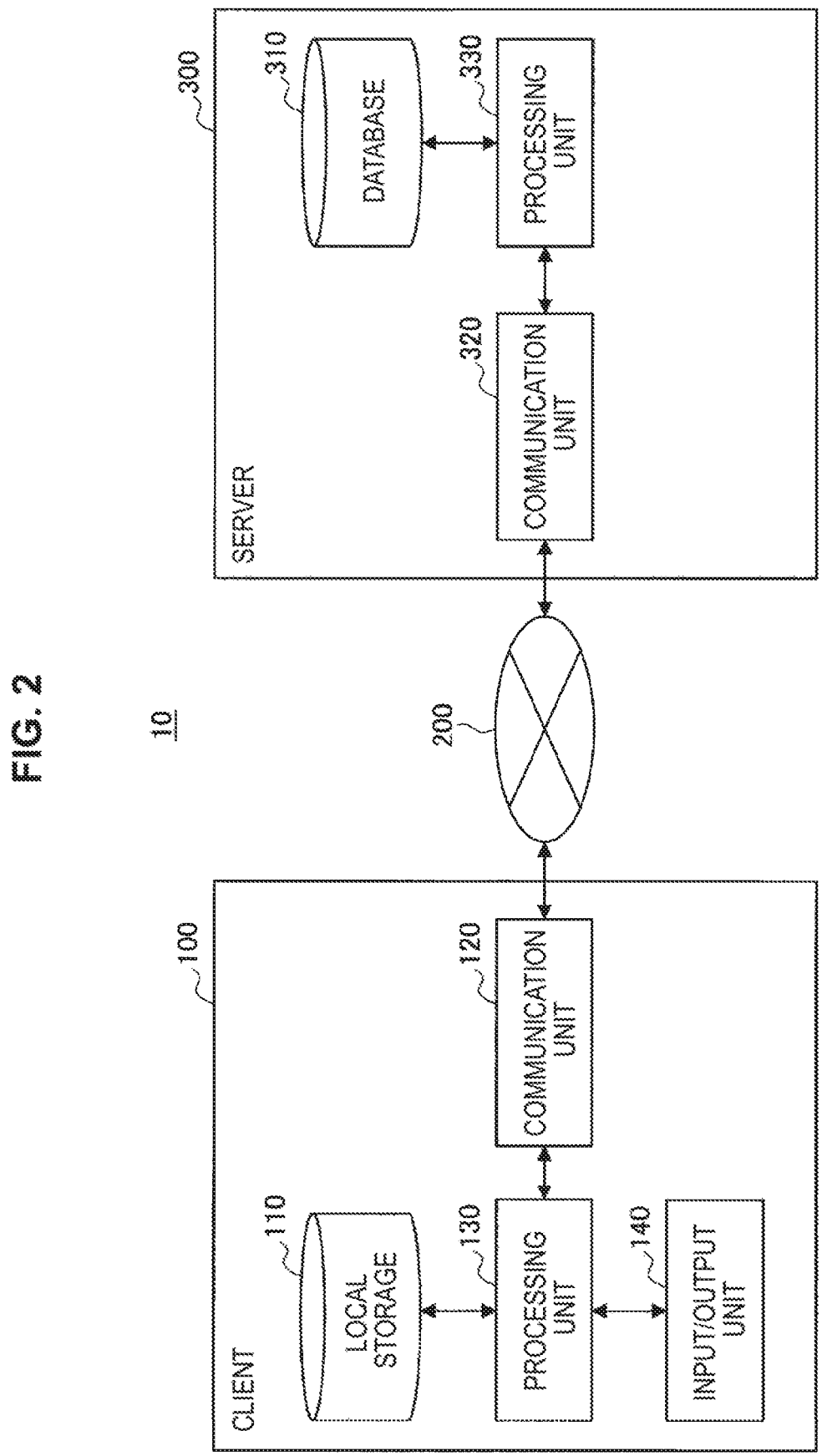
FIG. 2 is a block diagram illustrating an internal configuration of a system according to an embodiment of the present disclosure.

FIG. 2 is a block diagram illustrating an internal configuration of a system according to an embodiment of the present disclosure. Referring to FIG. 2, the client 100 may include local storage 110, a communication unit 120, a processing unit 130, and an input/output unit 140. The server 300 may include the database 310, a communication unit 320, and a processing unit 330. Hereinafter, each of the functional elements will be described further. Note that the terminal device that functions as the client 100, and the one or multiple server devices included in the server 300, are realized by the hardware configuration of the information processing device described later, for example.

<1-1. Client Configuration>

The local storage 110 is realized by memory or storage included in the terminal device, for example. In the local storage 110, information provided by the server 300 over the network 200 and information input by the user through the input/output unit 140 is stored temporarily or persistently, for example. The user utilizes the information stored in the local storage 110 to reference information provided by the server 300 even while offline, or to input a draft of information to provide to the server 300.

The communication unit 120 communicates with the server 300 over the network 200. The communication unit 120 is realized, for example, by a communication device that executes communication on a network to which the client 100 is connected.

The processing unit 130 is realized by a processor such as a central processing unit (CPU) included in the terminal device, for example. For example, the processing unit 130 executes a process of requesting information from the server 300 through the communication unit 120, based on information input by the user through the input/output unit 140. As another example, the processing unit 130 130 executes a process of outputting information to the user through the input/output unit 140, based on information provided by the server 300 through the communication unit 120. At this point, the processing unit 130 may also execute a process of converting provided information into a suitable format according to the type of the input/output unit 140.

The input/output unit 140 is realized by an input device, such as a touch panel, mouse, keyboard, microphone, or camera (imaging device), and an output device, such as a display or speaker, included in the terminal device, for example. Note that the input/output unit 140 may also include only one of either an input device or an output device. For example, information received from the server 300 through the communication unit 120 is processed by the processing unit 130 and displayed on a display included in the input/output unit 140. As another example, user operating input acquired by a touch panel or the like included in the input/output unit 140 is processed by the processing unit 130 and transmitted to the server 300 through the communication unit 120.

Since the functions themselves of the processing unit 130 and the input/output unit 140 as above are similar to the functions of a procession unit and an input/output unit in a typical terminal device, for example, a detailed explanation thereof may be reduced or omitted in the following description of the present embodiment. However, even in such cases, if the information received from the server 300 is characteristic, for example, the functions of the processing unit 130 or the input/output unit 140 in the client 100 with respect to processing and outputting such information may also be characteristic compared to these functions in a typical terminal device.

<1-2. Server Configuration>

The database 310 is realized by memory or storage included in the server device, for example. As described earlier, in the database 310, information related to real estate and transactions thereof is stored. Also, in the database 310, information related to a user of the client 100 may also be stored. Note that more specific types of information stored in the database 310 may differ depending on the content of the service provided by the server 300.

The communication unit 320 communicates with the client 100 over the network 200. Additionally, the communication unit 320 may also communicate with an external server over the network 200. The communication unit 320 is realized by a communication device that executes communication on a network, for example, to which the server 300 is connected.

The processing unit 330 is realized by a processor such as a CPU included in the server device, for example. For example, the processing unit 330 executes a process of acquiring information from the database 310 based on information received from the client 100 through the communication unit 320, and after processing the acquired information as necessary, transmitting to the client 100 through the communication unit 320.

Note that if the server 300 is multiple server devices, the functional configuration of the server 300 described above may be realized distributed among the multiple server devices. For example, the functions of the database 310 may be realized by being concentrated in one of the server devices or may be realized by centrally operating and managing a database distributed among multiple server devices. As another example, the functions of the processing unit 330 may also be realized by centrally operating and managing a processor distributed among multiple server devices. In this case, the functions of the processing unit 330 described hereinafter may be realized by being distributed serially or in parallel among multiple server devices, regardless of the demarcations of the function blocks defined for the sake of explanation.

<<2. Functional Configuration>>

Next, a functional configuration of the database 310 and the processing unit 330 of the server 300 will be described with reference to FIG. 3.

Figure 3:
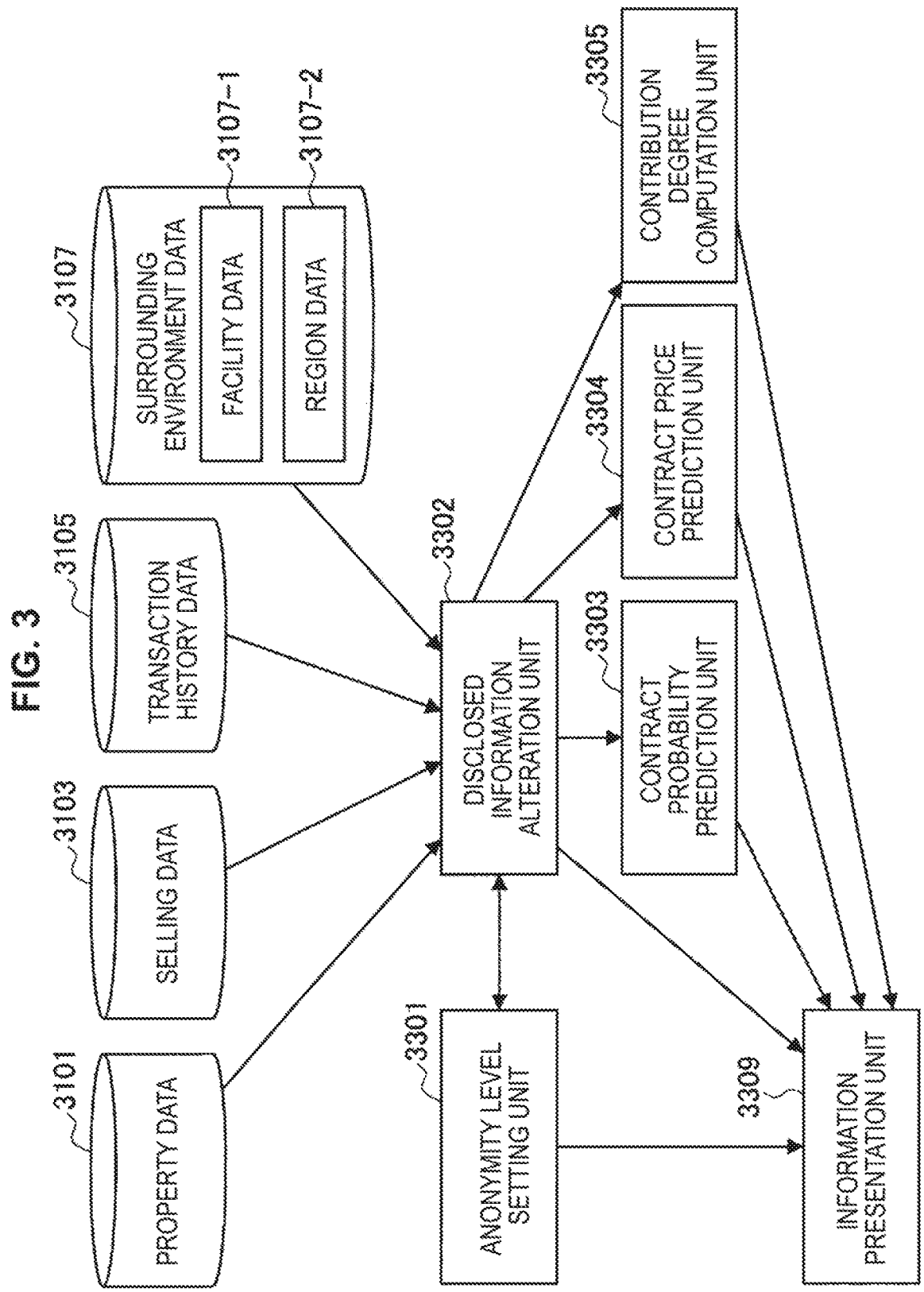
FIG. 3 is a block diagram illustrating an exemplary functional configuration of a database and a processing unit of a server according to an embodiment of the present disclosure.

FIG. 3 is a block diagram illustrating an exemplary functional configuration of a database and a processing unit of a server according to an embodiment of the present disclosure. The diagram illustrates, as functions of the database 310 of the server 300, property data 3101, selling data 3103, transaction history data 3105, and surrounding environment data 3107. Additionally, the diagram illustrates, as functions of the processing unit 330, an anonymity level setting unit 3301, a disclosed information alteration unit 3302, a contract probability prediction unit 3303, a contract price prediction unit 3304, a contribution degree computation unit 3305, and an information presentation unit 3309. Hereinafter, each of the structural elements will be described further.

<2-1. Exemplary Configuration of Database>

(Property Data 3101)

The property data 3101 functions as master data of real estate properties handled by the service provided by the server 300. The real estate properties may include any of various types of properties, such as land, freestanding buildings, apartments, town houses, and commercial properties, for example. In the property data 3101, data related to these types of real estate properties is registered in association with an ID unique to each property, for example. More specifically, for example, data related to a piece of land may include information such as the type of property, the location, and the around area. Data related to a building additionally may include information such as the floor area, the room arrangement, facilities, the construction date, the direction of openings, and the lighting state. Furthermore, the data may also include images of features such as the exterior and interior of the property, or the view from the property. If a building has been rebuilt or renovated, for example, data associated with a new ID may be added as a separate property, or a history of the rebuilding, renovation, or the like may be included in the property data 3101.

(Selling Data 3103)

The selling data 3103 includes data related to the selling currently in progress of real estate properties registered in the property data 3101. More specifically, the selling data 3103 stores data such as the property ID, the selling date, the selling price (including a history of alterations), the reason for selling, the current owner, the agent responsible for selling, and introductory text created by the owner or the agent at the time of selling. The selling data 3103 stores data related to properties currently for sale. The selling data 3103 is unique with respect to the selling organization and the property ID (for example, if the same property is being sold in parallel by multiple agents, multiple sets of selling data 3103 may be created for each agent with respect to the same property ID). In addition, if a transaction is established for a property being sold, some or all of the selling data 3103 for that property is moved to the transaction history data 3105.

(Transaction Data 3105)

The transaction data 3105 includes data related to transactions established for real estate properties registered in the property data 3101. More specifically, the transaction data 3105 stores data such as the transaction ID, the property ID, the selling date, the contract date, the selling price (including a history of alterations), the contract price, the reason for selling, the seller (old owner), the buyer (new owner), the agents on the seller side and the buyer side, and introductory text created by the owner or the agent at the time of selling. As described already, the transaction data 3105 may also be generated on the basis of the selling data 3103 of a property for which a transaction has been established. Alternatively, the transaction data 3105 may be generated by importing data about a transaction history provided by a service (including public services) provided by an external server. Whereas the selling data 3103 is unique with respect to the selling organization and the property ID as above, in the transaction data 3105, multiple sets of data may exist with respect to a single property ID, if the property is one for which transactions have been established multiple times in the past. Consequently to identify each transaction uniquely as above, a separate transaction ID may also be set in the transaction data 3105.

(Surrounding Environment Data 3107)

The surrounding environment data 3107 (facility data 3107-1 and region data 3107-2) includes data related to the surrounding environment of real estate properties registered in the property data 3101. For example, the facility data 3107-1 includes data related to various types of facilities located in the vicinity of the real estate property. In this case, the facility data 3107-1 may include information such as a facility's position information, type, name, and opening or closing dates. The facilities include transportation facilities such as train stations, shops, evacuation facilities, parks, medical institutions, and schools. Also, for example, the region data 3107-2 include data related to regions where a property is located.

<2-2. Exemplary Configuration of Processing Unit>

(Anonymity Level Setting Unit 3301)

The anonymity level setting unit 3301 sets an anonymity level of real estate information for a real estate transaction, or in other words, a supplier-side privacy disclosure level. The setting of an anonymity level may be set arbitrarily by the supplier of real estate information (the seller or lender), or may be set automatically. The setting of an anonymity level by the supplier of real estate information may be conducted from an "anonymity level adjustment screen" described later with reference to FIG. 10. The higher the anonymity level (that the lower the privacy disclosure level), the greater the number of properties that could be identified by the disclosed real estate information, and the supplier-side privacy is maintained. On the other hand, the lower the anonymity level (that is, the higher the privacy disclosure level), the fewer the number of properties that could be identified by the disclosed real estate information, and although the supplier-side privacy is not maintained, there is a high likelihood that the contract price and the contract probability described later will rise. The anonymity level set by the anonymity level setting unit 3301 is output to the disclosed information alteration unit 3302 described later, and the disclosed information is altered in accordance with the anonymity level.

In the present embodiment, the real, estate information which may be disclosed is anticipated to be data included in the selling data 3103 described above, and data about the environment surrounding the property extracted from the surrounding environment data 3107. For example, the real estate information includes the location of the property, the time from the closest station on foot or by bus, the floor number, the type (such as apartment, freestanding building, or land), the age of the property, the area, the layout, the right of site, property photos (exterior photos, the view from a veranda, the floor plan, room photos), the reason for explanatory text about the property (such as introductory text about the property or social media reviews), and the like. Also, the real estate information includes information such as administrative expenses, rent and parking fees, the desired sale price, and sensor data (ambient noise, amount of sunshine, ventilation, fallen leaves, signal reception). Additionally, the real estate information may also include information such as nearby facility (nearest station, nearest supermarket, nearest bus station, nearest expressway entrance, dams, evacuation facilities, sightseeing facilities, parks, public facilities, medical institutions, schools), surrounding region features (crime map, height above sea level, cliffs, liquefaction, seashore, rivers, forests, farmland, government districts, urban planning, heavy snowfall regions, disaster map, average temperature, weather, along major roadway, beside railway line, airbase, island, peninsula).

In addition, the anonymity level setting unit 3301 may also be computed on the basis of disclosed real estate information altered by the disclosed information alteration unit 3302. As described later, cases in which the disclosed information alteration unit 3302 alters the disclosed real estate information in accordance with operation input by a user (the supplier of real estate information) are also anticipated, and the anonymity level setting unit 3301 is also capable of computing the anonymity level of disclosed real estate information that has been altered by a user operation.

Herein, the method of computing the anonymity level may be conducted according to the technique given below, for example. In each of the formulas below, suppose that x is equal to the number (an integer from 1 to n) of properties matching a condition (disclosed real estate information), while n is equal to the total number (an integer equal to or greater than 1) of properties existing in the property data 3101. Note that the computation method given below is merely one example, and the method of computing the anonymity level according to the present embodiment is not limited thereto.

(a) Anonymity Level=x

The anonymity level setting unit 3301 may treat the number itself of properties matching the condition as the anonymity level. The number of properties matching the condition is the number of properties that could be identified by the disclosed real estate information. In this case, on a presentation screen presented to the user, the k-anonymity of the disclosed information is displayed directly, easily communicating to the user that "the greater the number of properties matching the condition, the higher the anonymity". For example, in a case in which the user sets "anonymity level: 30 (properties)", the disclosed information alteration unit 3302 alters the granularity of the disclosed real estate information so that the number of matching properties is at least 30. Also, in a case in which the disclosed, real estate information is altered by the disclosed information alteration unit 3302, the anonymity level setting unit 3301 computes the number of properties matching the altered disclosed real estate information directly as the anonymity level.

(b) Anonymity Level=log(x)

The anonymity level setting unit 3301 may treat the logarithm of the number (x) of properties, matching the condition as the anonymity level. For example, between a case in which the number of properties matching the condition increases from 100 properties to 200 properties, and a case in which the number increases from 10,000 properties to 10,100 properties, it can be communicated to the user that the anonymity level increases more for the former. This is useful when ascertaining the increase or decrease of the anonymity level before and after alteration in cases in which the disclosed real estate information is altered several times by the user (or automatically).

$$(c) \text{Anonymity level} = \frac{2^{\left(\frac{x-1}{500}\right)} - 1}{2^{\left(\frac{x-1}{500}\right)}}$$

The anonymity level setting unit 3301 can also compute treat the number (x) of properties matching the condition, normalized to a value from 0 to 1, as the anonymity level. For example, according to the above formula, in the case in which the number (x) of properties matching the condition is 1 property, the anonymity level is 0.0, while in the case of 501 properties, the anonymity level is 0.5, and in the case of 1,001 properties, the anonymity level is 0.75. Note that a parameterization of the above formula is indicated below.

$$\text{Anonymity level} = \frac{a^{\left(\frac{x-1}{b}\right)} - c}{a^{\left(\frac{x-1}{b}\right)}}$$

Herein, provided that a=2 and c=1, the anonymity level becomes 0.5 when x=(b+1), and thereafter, the anonymity level approaches 1 as b increases.

$$(d) \text{Anonymity level} = \frac{2^{\log(x^{0.5})} - 1}{2^{\log(x^{0.5})}}$$

The anonymity level setting unit 3301 may also correct the score in (c) above to a logarithm as the anonymity level. For example, according to the above formula, in the case in which the number (x) of properties matching the condition is 1 property, the anonymity level is 0.0, while in the case of 100 properties, the anonymity level is 0.5, and in the case of 10,000 properties, the anonymity level is 0.75. Note that a parameterization of the above formula is indicated below.

$$\text{Anonymity level} = \frac{a^{\log(x^b)} - c}{a^{\log(x^b)}}$$

Herein, provided that a=2 and c=1, the anonymity level becomes 0.5 when $\log(x^b)=1$, and thereafter, the anonymity level approaches 1 as multiplied by (base of logarithm)^(1/b).

(e) Anonymity Level=x/n

The anonymity level setting unit 3301 may treat the ratio with respect to the total number of properties as the anonymity level.

(f) Anonymity Level=$(x/n)^{0.2}$

The anonymity level setting unit 3301 is also capable of adjusting the relationship between the ratio in (e) above and the anonymity level. A parameterization of the above formula is indicated below.

Anonymity level=$(x/n)^a$

Herein, the anonymity level matches (e) above when a=1.

(g) Anonymity Level=x−1

The anonymity level setting unit 3301 may also treat the number obtained by subtracting the property itself that is to be sold from (a) above as the anonymity level.

(Disclosed Information Alteration Unit 3302)

The disclosed information alteration unit 3302 alters the granularity of the real estate information to disclose, in accordance with the anonymity level set by the anonymity level setting unit 3301. The disclosed information alteration unit 3302 alters the disclosed real estate information according to methods like those indicated below, for example.

Shorten: The location and names of surrounding facilities are shortened, such as altering "000-111 1-Chome, Nishi-Shinjuku, Shinjuku-ku, Tokyo" to "1-Chome, Nishi-Shinjuku, Shinjuku-ku, Tokyo", for example.

Group multiple items: Information is grouped inclusively, such as altering "area 34.5 m²" to "area from 30 m² to 40 m²", altering "3 min on foot" to "within 5 min on foot", and altering "located on 12th floor" to "located above 10th floor", for example.

Express differently: The expression is altered, such as altering "minutes on foot" to "minutes by car" or "minutes by bicycle", or by using a non-numerical expression (such as distant or nearby, for example).

Alter to general name: A name that includes a proper noun is altered to a general name, such as altering a nearby facility from "BB Mart" to "convenience store", or altering "CC Elementary School" to "elementary school", for example.

Mask portion: Image processing is conducted to blur out text (such as addresses or proper nouns, property names, and telephone numbers), people, landmarks, and the like appearing in a property photo, for example.

Alter, to different, equivalent information: For example, the floor plan is altered to a different floor plan that many people would consider the same. An example of altering the floor plan will be described later with reference to FIGS. 18 and 19.

Besides altering disclosed real estate information by the methods described above automatically in accordance with the anonymity level, the disclosed information alteration unit 3302 is also capable of making alterations by following operation input provided by the seller side. A user on the seller side is able to directly alter the disclosed real estate information of a property for sale manually from the input/output unit 140 of the client 100. Additionally, the disclosed information alteration unit 3302 may also present alteration methods or alteration suggestions to a user on the seller side, and make alterations by alteration methods and alterations suggestions selected by the user.

In addition, the disclosed information alteration unit 3302 may also alter the granularity of disclosed real estate information in accordance with a trust level of the buyer side. For example, the disclosed information alteration unit 3302 makes alterations to make the granularity of the disclosed real estate information finer with respect to a higher trust level computed for each buyer-side user who views the real estate information, and to make the granularity coarser with respect to a lower trust level. The trust level of a buyer-side user may be computed by the processing unit 330, on the basis of buyer-side user activity information (such as an access log on a real estate trading site, a usage log of a virtual preview service, or an activity log inside a virtual preview service) obtained by referencing the transaction history data 3105, for example. Alternatively, the trust level of a buyer-side user may be computed by utilizing attributes of the buyer-side user (such as income, geographical region, occupation, and history of mortgage payments).

In this way, by making the information granularity of the disclosed real estate information coarser, identification of the property is avoided, and the seller-side privacy (the fact that the property is being offered for sale, and detailed information about the property being known) is maintained. Note that although the seller-side privacy is maintained, as the granularity of the disclosed real estate information becomes coarser, the buyer side becomes unable to view important information for reaching a contract on the property, and the possibility of not reaching a contract rises. Accordingly, in the present embodiment, a contract price and a contract probability based on the disclosed real estate information are predicted by the contract probability prediction unit 3303 and the contract price prediction unit 3304 described later, and the prediction result (one example of an evaluation value) is provided to the seller side as feedback. With this arrangement, the seller side can select an anonymity level felt to strike a good balance between the anonymity level of the disclosed real estate information versus the predicted contract price and the predicted contract probability, and thus the seller-side privacy is maintained, while in addition, real estate transactions are revitalized.

Note that the disclosed information alteration unit 3302 according to the present embodiment may also make alterations automatically so as to maximize at least one evaluation value from among respective evaluation values such as the predicted contract price, the predicted contract probability, or the degree of contribution to the contract price or contract probability described later, and the anonymity level. For example, the disclosed information alteration unit 3302 alters the granularity of the disclosed real estate information to maximize the predicted contract price, the predicted contract probability, and the anonymity level computed according to Formula 1 below.

[Math. 1]

$$c_{price} \frac{pricePred(z_{anonymized})}{pricePred(z_{original})} + \\ c_{probability} \frac{probabilityPred(z_{anonymized}, c_{days})}{probabilityPred(z_{original}, c_{days})} + \\ c_{anonymity} \cdot anonymity(z_{anonymized})$$

Formula 1

In Formula 1 above, the following are defined:

$z_{original}$: The original property feature (real estate information such as the floor number, type, layout, or area, for example)

$z_{anonymized}$: The anonymized property feature (disclosed real estate information)

pricePred(z): The predicted value of the contract price with respect to property feature z probabilityPred(z, d): The predicted value of the probability of reaching a contract with respect to property feature z within a number of days d anonymity(z): The anonymity level of property feature z (see (a) to (g) above for methods of computing the anonymity level)

$c_{price}$: A price coefficient (the importance of the contract price)

$c_{probability}$: A probability coefficient (the importance of the contract probability)

$c_{anonymity}$: An anonymity level coefficient (the importance of the anonymity level)

$c_{days}$: The number of days with which to evaluate the contract probability

In addition, the disclosed information alteration unit 3302 may also make alterations automatically to maximize at least one evaluation value from among the predicted contract price, the predicted contract probability, and the degree of contribution to the contract price or the contract probability, while keeping the anonymity level at a fixed level or greater. For example, the disclosed information alteration unit 3302 alters the granularity of the disclosed real estate information to maximize the predicted contract price computed according to Formula 2 below, while keeping the anonymity level at a fixed level or greater.

[Math. 2]

$$\frac{pricePred(z_{anonymized})}{pricePred(z_{original})}$$

Formula 2

In addition, the disclosed information alteration unit 3302 may also compute a personalized evaluation value as a weighted sum, with different weightings for each user, of respective evaluation values such as the predicted contract price, the predicted contract probability, the degree of contribution to the contract price or the contract probability, and the anonymity level, and make alterations to maximize this personalized evaluation value. For example, the disclosed information alteration unit 3302 is able to compute the personalized evaluation value by setting the coefficient portion ($c_{price}$, $c_{probability}$, $c_{anonymity}$, $c_{days}$) the evaluation values in Formula 1 above for each use. By changing these parameters for each user, for example, for a selling user A who is in a hurry to sell, it is possible to set "$c_{days}$: 30" and evaluate the contract probability within one month, whereas for a selling user B who is not in a hurry, it is possible to set "$c_{days}$: 90" and evaluate the contract probability within three months.

In addition, the disclosed information alteration unit 3302 may also conduct automatic anonymization using a greedy algorithm. Specifically, the disclosed information alteration unit 3302 acquires all granularity alteration patterns that improve the anonymity level with respect to each item of property information, as well as an "anonymity level improvement" and a "decline in the predicted value of the contract price or the contract probability for each certain period" obtained by each granularity alteration pattern, and specifies the granularity alteration pattern for which "'decline in the predicted value of the contract price or the contract probability for each certain period'/'anonymity level improvement'" is minimized. At this point, the "decline in the predicted value of the contract price or the contract probability for each certain period" is a numerical value greater than 0 that becomes a greater numerical value as the predicted value changes to become smaller. Also, the "anonymity level improvement" is a numerical value greater than 0 that becomes a greater numerical value as the anonymity level changes to become higher. The disclosed information alteration unit 3302 may also repeat such a process of specifying a granularity alteration pattern until a specified anonymity level is satisfied.

In addition, by utilizing various existing search algorithms with respect to a data structure that treats the property information as vertices and alterations in the granularity with respect to the property information as edges, the disclosed information alteration unit 3302 is also capable of specifying a granularity alteration pattern that optimizes combinations. For example, the disclosed information alteration unit 3302 may select a candidate having a minimum "decline in the predicted value of the contract price or the contract probability for each certain period" from among granularity alteration patterns that satisfy a specified anonymity level.

Also, the disclosed information alteration unit 3302 may apply a correction so as not to bias an item of the anonymization process target. For example, the disclosed information alteration unit 3302 may set an already-anonymized item as a bias item making it harder to treat that item as a target of the anonymization process. With this arrangement, it is possible to avoid anonymization biases such as simply shortening the location information only.

(Contract Probability Prediction Unit 3303)

The contract probability prediction unit 3303 predicts the contract probability in one or more certain periods, on the basis of disclosed real estate information which has been altered (anonymized) by the disclosed information alteration unit 3302. The contract probability is an example of an evaluation value of altered real estate information, and the contract probability prediction unit 3303 corresponds to a decision unit that decides the evaluation value.

In addition, the contract probability prediction unit 3303 may also maximize and predict the contract probability on the basis of a buyer-side user's search history by utilizing the kinds of property features (real estate information to be disclosed, such as the floor number, type, layout, and area, for example) that return search hits (that is, the expectation that the property will be found in a search). This is because the contract probability of a relevant property is -thought to rise as more easily-searched property features are included (that is, as more easily-searched real estate information is disclosed).

Additionally, the contract probability prediction unit 3303 is also capable of referencing the selling data 3103, and predicting the contract probability on the basis of the number of properties being offered for sale which match the real estate information to be disclosed (that is, the number of similar properties). This is because the contract probability of a relevant property is thought to fall as a greater number of similar properties exist.

In addition, the contract probability prediction unit 3303 is also capable of referencing the transaction history data 3105, and predicting the contract probability on the basis of contract case data thus far. Specifically, the contract probability prediction unit 3303 references the property features and/or the granularity (or anonymity level) of disclosed real estate information for properties that led to a successful contract, and predicts the contract probability of such a property. Also, the contract probability prediction unit 3303 may predict the contract probability using a nearest neighbor algorithm. In other words, an arbitrary number of properties (for example, 100 properties) having features close to the property currently targeted for prediction is extracted from past contract case data (transaction history data 3105), a "period from being offered for sale until contract" is acquired for each of the extracted nearby properties, and the contract probability is predicted. Specifically, the ratio of property cases that reached a successful contract within one month of being offered for sale from among the total number of nearby properties may be predicted as a "predicted value of the contract probability within one month", the ratio of property cases that reached a successful contract within two month of being offered for sale from among the total number of nearby properties may be predicted as a "predicted value of the contract probability within two months", and the ratio of property cases that reached a successful contract within three months of being offered for sale from among the total number of nearby properties may be predicted as a "predicted value of the contract probability within three months". Herein, the term "close" in "properties having close features (nearby properties)" above refers to computing, the Euclidean distance for respective property features, such as location, exclusively-owned area, and layout, with "close" meaning a smaller total sum of these distances. Note that in the case of features whose Euclidean distance cannot be computed simply, the distance may be computed as 0 if the features are the same, whereas the distance may be computed as a distance w (set as a parameter) if the features are not the same. Also, the "expectation that the property will be found in a search" and the "number of properties being offered for sale which match the real estate information to be disclosed" described above may also be utilized as features for computing the Euclidean distance in a nearest neighbor algorithm.

(Contract Price Prediction Unit 3304)

The contract price prediction unit 3304 predicts the contract price on the basis of disclosed real estate information which has been altered (anonymized) by the disclosed information alteration unit 3302. The contract price is an example of an evaluation value of altered real estate information, and the contract price prediction unit 3304 corresponds to a decision unit that decides the evaluation value.

For example, the contract price prediction unit 3304 is also capable of referencing the selling data 3103, and predicting the contract price on the basis of the number of properties being offered for sale which match the real estate information to be disclosed (that is, the number of similar properties). This is because the contract price of a relevant property is thought to fall as a greater number of similar properties exist.

In addition, the contract price prediction unit 3304 is also capable of referencing the transaction history data 3105, and predicting the contract price on the basis of contract case data thus far. Specifically, the contract price prediction unit 3304 references the property features and/or the granularity (or anonymity level) of disclosed real estate information for properties that led to a successful contract, and predicts the contract price of such a property. Also, the contract price prediction unit 3304 may predict the contract price using a nearest neighbor algorithm. In other words, an arbitrary number of properties (for example, 10 properties) having features close to the property currently targeted for prediction is extracted from past contract case data (transaction history data 3105), a "contract price per unit of exclusively-owned area" is acquired for each of the extracted nearby properties, the average value is multiplied by the exclusively owned area of the property to be predicted, and the result is predicted as the contract price. Herein, the term "close" in "properties having close features (nearby properties)" refers to computing the Euclidean distance for respective property features, such as location, exclusively-owned area, and layout, with "close" meaning a smaller total sum of these distances. Note that in the case of features whose Euclidean distance cannot be computed simply, the distance may be computed as 0 if the features are the same, whereas the distance may be computed as a distance w (set as a parameter) if the features are not the same. Also, the "number of properties being offered for sale which match the real estate information to be disclosed" described above may also be utilized as features for computing the Euclidean distance in a nearest neighbor algorithm.

Note that the method of predicting the contract price or the contract probability may also be a method in which the contract price or the contract probability is predicted with respect to all conditions which can be anticipated from the disclosed property information, and the average or minimum value is computed. For example, in the case in which the floor number included in the disclosed property information is "12th to 14th floor", the contract price or the contract probability is predicted for a property on each of the 12th, 13th, and 14th floors, and the average or minimum value is computed. By referencing the predicted contract price or contract probability to decide the selling price, the selling user is able to keep the floor number from being identified by the buyer side from the selling price.

Additionally, the contract price or the contract probability may be predicted respectively for all conditions which can be anticipated from the disclosed property information, and averaged by using some kind of parameter. The case of a method in which an average or minimum value is computed as described above is because anonymization produces bias, and there is a possibility that the actual degree of anonymization may decrease.

Additionally, the method of predicting the contract price or the contract probability may also be a method in which a degree of opportunity loss is computed, and a correction is applied to the contract price or the contract probability. The degree of opportunity loss is the degree to which the anonymization of the disclosed property information causes search hits not to be returned to the buyer side, or causes the buyer side not to understand whether or not the property matches the buyer's own preferences, and thus does not lead to a purchase.

(Contribution Degree Computation Unit 3305)

The contribution degree computation unit 3305 predicts a degree of contribution to the contract probability or a degree of contribution to the contract price for each item included in the disclosed real estate information which has been altered and anonymized by the disclosed information alteration unit 3302. The degree of contribution to the contract probability or the contract price is an example of an evaluation value of altered real estate information, and the contribution degree computation unit 3305 corresponds to a decision unit that decides the evaluation value.

For example, on the basis of contract case data, the contribution degree computation unit 3305 computes the degree of contribution to the contract probability or the contract price, such as to what degree which items among the real estate information of a property contribute to the contract probability or the contract price. By presenting to the seller the degree of contribution to the contract probability or the contract price by each item of real estate information, the seller is able to adjust the anonymity level of each item with consideration for the degree of contribution. An example of a presentation screen presenting such a degree of contribution by each item will be described later with reference to FIGS. 16 and 17.

(Information Presentation Unit 3309)

The information presentation unit 3309 presents to the user, via the client 100, information including the disclosed real estate information altered by the disclosed information alteration unit 3302, the contract probability predicted by the contract probability prediction unit 3303, the contract prediction predicted by the contract price prediction unit 3304, the anonymity level set by the anonymity level setting unit 3301, and the like. More specifically, the information presentation unit 3309 generates data for outputting an image to a display included in the input/output unit 140 of the client 100, and causes the generated data to be transmitted from the communication unit 320 to the client 100. Note that the method of outputting information to the client 100 is not limited to image display. For example, audio output may be adopted instead of, or in addition to, image display.

The above thus describes a functional configuration of the database 310 and the processing unit 330 of the server 300 according to the present embodiment. Note that although the present embodiment uses a real estate information presentation system for real estate buying and selling transactions as an example, the present embodiment is not limited to "buying and selling transactions" of real estate, and is also applicable to "rental transactions" of real estate. In this case, rental data is stored instead of the selling data 3103, for example.

<<3. Real Estate Information Presentation Process>>

Next, the flow of a real estate information presentation process access will be described specifically with reference to FIG. 4.

Figure 4:
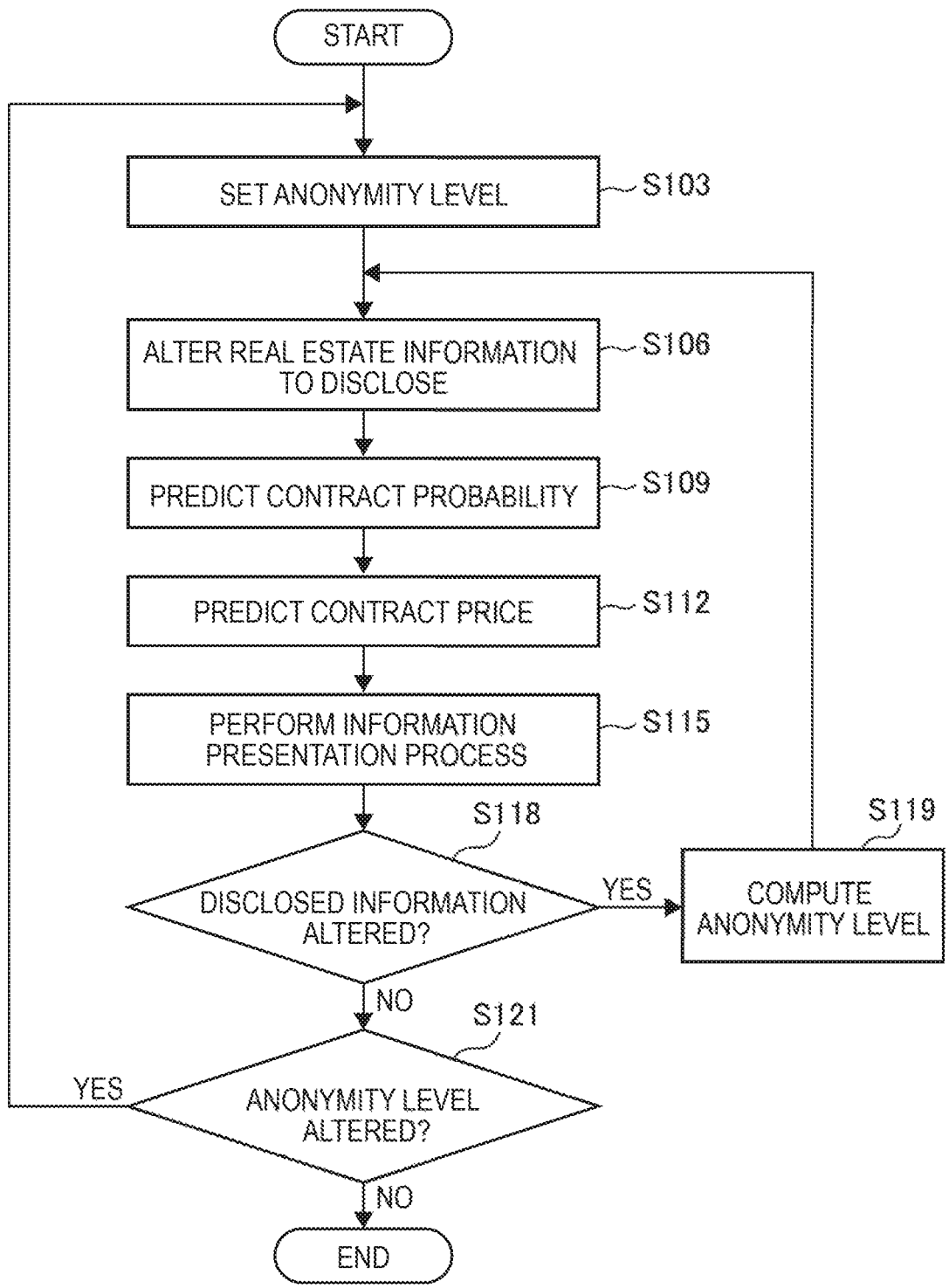
FIG. 4 is a flowchart illustrating a real estate information presentation process according to the present embodiment.

FIG. 4 is a flowchart illustrating a real estate information presentation process according to the present embodiment. As illustrated in FIG. 4, first, in step S103, the anonymity level setting unit 3301 included in the processing unit 330 of the server 300 sets an anonymity level. The setting of the anonymity level may be an anonymity level specified by a seller-side user, or an anonymity level preregistered on the system side.

Next, in step S106, the disclosed information alteration unit 3302 alters the real estate information to disclose, in accordance with the set anonymity level. In other words, the disclosed information alteration unit 3302 alters the information granularity of each item of real estate information input in advance (extractable from the selling data 3103) in accordance with the set anonymity level, and anonymizes the real estate information. For example, in the case in which the number of properties matching a condition is set directly as the anonymity level, the disclosed information alteration unit 3302 alters the granularity of the real estate information so that the anonymity level becomes real estate information matched by 100 or more properties, for example. More specifically, "floor number: 11th" included in the real estate information is altered to "floor number: 10th or higher", "minutes on foot: 3 minutes" is altered to "minutes on foot: within 5 minutes", or "exclusively-owned area: 37.1 m$^2$" is altered to "35 m$^2$ to 40 m$^2$", for example.

Subsequently, in step S109, the contract probability prediction unit 3303 predicts the contract probability on the basis of the altered disclosed real estate information.

Next, in step S112, the contract price prediction unit 3304 predicts the contract price on the basis of the altered disclosed real estate information.

Subsequently, in step S115, the information presentation unit 3309 presents to the user, via the client 100, information including the disclosed real estate information altered by the disclosed information alteration unit 3302, the predicted contract probability, the predicted contract price, and the anonymity level. With this arrangement the seller-side user is able to adjust the anonymity level (or manually alter the disclosed information) with consideration for the balance between the anonymity level of the disclosed real estate information versus the predicted contract probability and the predicted contract price.

Next, in the case in which the seller-side user alters the disclosed information (S118/Yes), in step S119, the anonymity level setting unit 3301 computes the anonymity level on the basis of the disclosed real estate information input by the seller-side user. Subsequently, the alteration of the disclosed real estate information (specifically, the alteration to the disclosed real estate information input by the seller-side user), the prediction of the contract probability, and the prediction of the contract price indicated in steps S106 to S112 above are conducted again, and in S115, the information presented to the user is updated.

Also, in the case in which the seller-side user alters the anonymity level (S121 Yes). S103 to S118 above are repeated, and the alteration of the disclosed real estate information and the prediction of the contract probability and the contract price are conducted again and presented to the user.

By the operating process described above, the seller-side user is able to decide the real estate information to disclose while also considering the balance between the anonymity level versus the contract probability and the contract price.

Also, in the operating process described above, in S106, the disclosed information alteration unit S302 alters the disclosed real estate information in accordance with the set anonymity level, but the present embodiment is not limited thereto. For example, the disclosed information alteration unit 3302 may also make alterations to maximize each of the anonymity level, the predicted contract probability, and the predicted contract price (see Formula 1 above), or make alterations to maximize the predicted contract probability or the predicted contract price while keeping the anonymity level at a fixed level or greater (see Formula 2 above). Additionally the disclosed information alteration unit 3302 may also make alterations to maximized a personalized evaluation value.

<<4. Real Estate Information Presentation Screen Example>>

Next, an example of information presented in an embodiment of the present disclosure will be described with reference to an example of a screen displayed on a display included in the input/output unit 140 of the client 100, for example. Note that in the following description, an example of information presented when selling a condominium is described, but information may be presented similarly when considering selling a property other than a condominium, such as a freestanding building or land, for example. Also, it is possible to present similar information when renting out a property (real estate).

FIG. 5 is a diagram illustrating an example of a property information input screen displayed in the present embodiment. In the illustrated example, on a screen 1100, input fields 1101 for each of location, apartment name, room number, exclusively-owned area, layout, age of building, minutes on foot, floor number, and selling price tire displayed. A user inputs information into these input fields, and when finished, presses a "Next" button 1102.

FIG. 6 is a diagram illustrating an example of a disclosed property information setting screen displayed in the present embodiment. In the illustrated example, on a screen 1200, detailed information 1201 about a property including the information input on the property information input screen above, for example (more specifically, the location, apartment name, room number, exclusively-owned area, layout, age of building, minutes on foot, and floor number), and the desired selling price are displayed. Additionally, on the screen 1200, a price (contract price) 1202 is displayed as a result of a prediction performed by the contract price prediction unit 3304 for a sale transaction, and a probability (contract probability) 1203 is displayed for respective transaction periods as a result of predictions performed by the contract probability prediction unit 3303. The illustrated example indicates that the contract probability is 50% within one month, 70% within two months, and 85% within three months. Also, on the screen 1200, the number of properties that could be identified by the detailed information 1201 about property to be disclosed is displayed as an anonymity level 1204. In the illustrated example, all of the real estate information about the property to sell is being disclosed, and thus the number of properties matching the disclosed information, including the relevant property to sell, is "1 property", and the relevant property may be identified. Consequently, to anonymize the property information to disclose, the user presses an anonymity level adjustment button 1205.

Note that the anonymity level display screen is not limited to the example illustrated in FIG. 6. The display of the anonymity level illustrated in FIG. 6 corresponds to the computation method described in (a) above, but the anonymity level computation method may also be one of the methods indicated in (b) to (f). Examples of anonymity level display screens corresponding to these cases are illustrated in FIGS. 7 to 9.

Figure 7:
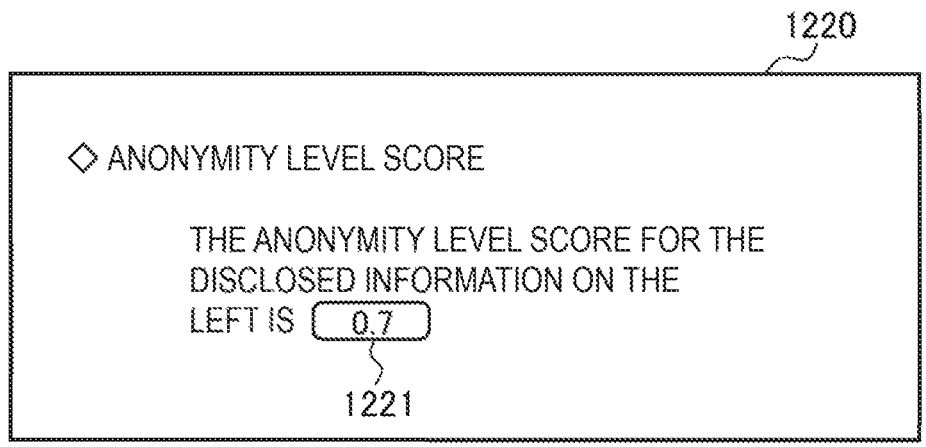
FIG. 7 is a diagram illustrating an example of a case of displaying an anonymity level as a numerical value according to the present embodiment.

FIG. 7 is a diagram illustrating an example of a case of displaying an anonymity level as a numerical value according to the present embodiment. On the anonymity level display screen 1220 illustrated in the upper part of FIG. 7, an anonymity level score 1221 computed according to the method described in (b), (c), (d), (e), (f) above is displayed. Also, on the anonymity level display screen 1230 illustrated in the lower part of FIG. 7, an anonymity level computed according to the method described in (a) above (the number itself of properties matching the disclosed information) 1232, and the total number of properties 1231 existing in the property data 3101 are both displayed.

Figure 8:
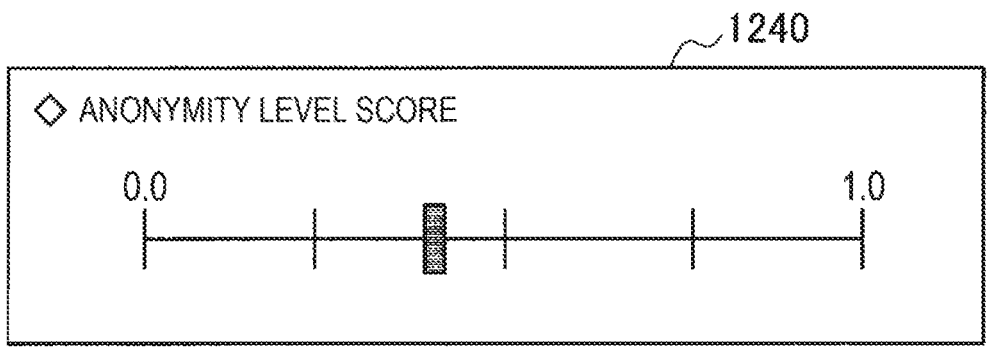
FIG. 8 is a diagram illustrating an example of a case of displaying an anonymity level as single-axis graph according to the present embodiment.

FIG. 8 is a diagram illustrating an example of a case of displaying an anonymity level as single-axis graph according to the present embodiment. On the anonymity level display screen 1240 illustrated in FIG. 8, an anonymity level score computed according to the method described in (c), (d), (e), or (f) above is displayed on a single-axis graph.

FIG. 9 is a diagram illustrating an example of a case of converting and displaying an anonymity level as a symbol according to the present embodiment. Herein, the anonymity level x computed according to the method described in (a) above (the number itself of properties matching the disclosed information) is converted into a symbol on the basis of the following threshold values, for example.

Examples of Threshold Values for Symbol Conversion
  ($x<=30$): Very Low
  ($30<x$) and ($x<=300$): Low
  ($300<x$) and ($x<=1500$): Moderate
  ($1500<x$) and ($x<=7500$): High
  ($7500<x$): Very High Additionally, the, converted symbol is displayed on a single-axis graph as illustrated by the anonymity level display screen 1250 in the upper part of FIG. 9, while a message is displayed as illustrated by the anonymity level display screen 1260 in the lower part of FIG. 9, for example.

Next, the anonymity level adjustment screen will be described with reference to FIG. 10. FIG. 10 is a diagram illustrating an example of an anonymity level adjustment screen according to the present embodiment. The anonymity level adjustment screens 1310 and 1320 illustrated in FIG. 10 are screens displayed when the anonymity level adjustment button 1205 is pressed on the disclosed property information setting screen 1200 illustrated in FIG. 6. The anonymity level adjustment screens 1310 and 1320 are displayed as pop-ups on the screen of the disclosed property information setting screen 1200, for example.

The anonymity level adjustment screen 1310 illustrated in the upper part of FIG. 10 is a screen for adjusting the anonymity level in the case in which the anonymity level is treated as the number of properties identified by the disclosed property information. The user is able to set the anonymity level by inputting a number of properties, and pressing an OK button 1313. If a Back button 1312 is pressed, the pop-up display of the anonymity level adjustment screen 1310 disappears, and the display returns to the disclosed property information setting screen 1200. Also, the anonymity level adjustment screen 1320 illustrated in the lower part of FIG. 10 is a screen for adjusting the anonymity level in the case in which the anonymity level is converted into a symbol. The user is able to set the anonymity level by moving an operable element 1321 left or right to specify the height of the anonymity level, and pressing an OK button 1323. If a Back button 1322 is pressed, the pop-up display of the anonymity level adjustment screen 1320 disappears, and the display returns to the disclosed property information setting screen 1200.

After changing the anonymity level in this way (see S121 illustrated in FIG. 4), the anonymity level setting unit 3301 included in the processing unit 330 of the server 300 sets the anonymity level in accordance with the operation input provided by the user, while the alteration of the disclosed real estate information is conducted by the disclosed information alteration unit 3302 (see S106 illustrated in FIG. 4).

FIG. 11 is a diagram illustrating an example of disclosed information altered in accordance with an anonymity level. In the illustrated example, on a screen 1400, there is displayed detailed information 1401 about a property, the information having been obtained by altering the granularity of the disclosed property information illustrated in FIG. 6 so that the anonymity level becomes equal to or greater than a lower limit of "100 properties" on the number of matching properties. More specifically, the location information "000-555 4-Chome, Nishi-Shinjuku, Shinjuku-ku, Tokyo" has been shortened to "4-Chome, Nishi-Shinjuku, Shinjuku-ku, Tokyo", the apartment name "AAA Tower" has been hidden from display, and the room number "1105" has also been hidden from display. Additionally, the exclusively-owned area "37.1 $m^2$" has been grouped into "30 $m^2$ to 40 $m^2$", the age "15 years" has been grouped into "13 years to 17 years", the minutes on foot "3 minutes" has been groups into "5 minutes or less", and the floor number "11th floor" has been grouped into "10th or higher".

By altering the granularity of the property information to be coarser in this way, an anonymity level 1404 is included in which the number of properties matching the detailed information 1401 has become more than 100 properties. Compared to the anonymity level 1204 in which one property (including the relevant properly) matches the detailed information 1201 displayed on the screen 1200 of FIG. 6, the anonymity has become higher due to the information alteration, and identification of the relevant property can be avoided, thereby protecting seller-side privacy.

On the other hand, as more properties match similar conditions (specifically the property features that could be identified by the disclosed property information), the market becomes advantageous to the buyer, and thus there is a tendency for the predicted contract price 1402 and the predicted contract probability 1403 to fall compared to the case of the anonymity level "1 property" in FIG. 6. In other words, since the probability of finding the property in a search falls, and in addition, the number of hits returned by a search with the same condition increases, a buyer having potential interest in the property no longer arrives at the property information, and thus there may be a tendency for the predicted contract price 1402 and the predicted contract probability 1403 to fall. The seller-side user considers such a balance between the anonymity level versus the predicted contract price and the predicted contract probability, and directly alters the granularity of the disclosed property information from the input fields, or presses the anonymity level adjustment button 1405 to alter the anonymity level again.

For example, in the case of desiring to raise the anonymity level further by changing to private the layout and the floor number of a property from among the detailed information 1401 on the screen 1400, the seller-side user performs direct operation input with respect to the relevant input fields to remove this information. After the disclosed information is altered in this way (see S118 illustrated in FIG. 4), the disclosed information alteration unit 3302 included in the processing unit 330 of the server 300 alters the disclosed real estate information in accordance with the operation input performed by the user (see S106 illustrated in FIG. 4). Additionally the anonymity level setting unit 3301 computes the anonymity level of the information altered by the disclosed information alteration unit 3302, and outputs to the information presentation unit 3309. An example of a presentation screen in the case of changing to private the layout and the floor number of a property will be described with reference to FIG. 12.

FIG. 12 is a diagram illustrating an example of a presentation screen in a case in which information about the layout and floor number of a property has been altered to private manually by the user. In the illustrated example, on a screen 1500, there is displayed detailed information 1501 in which information about the layout and the floor number is kept private. Note that the detailed information 1501 is similar to the detailed information 1401 displayed on the screen 1400 of FIG. 11, except that the information about the layout and the floor number has been altered to private.

By such an alteration, the property can no longer be identified from the information about the layout and the floor number, and thus the anonymity level 1504 rises higher than the anonymity level 1404 for the case of the detailed information 1401 on the screen 1400 (more specifically, the number of properties matching the disclosed information increases). On the other hand, as more properties match the condition, the market becomes advantageous to the buyer, and thus the predicted contract price 1502 and the predicted contract probability 1503 tend to fall farther compared to the case of the anonymity level of "107 properties" in FIG. 11. In other words, since the probability of finding the property in a search falls, and in addition, the number of hits returned by a search with the same condition increases, a buyer having potential interest in the property no longer arrives at the property information, and thus there may be a tendency for the predicted contract price 1502 and the predicted contract probability 1503 to fall. The seller-side user is able to repeatedly perform the direct alteration of the granularity of the disclosed property information or the changing of the anonymity level from the anonymity level adjustment screen (see FIG. 10) displayed when the anonymity level adjustment button 1505 is pressed.

FIG. 13 is a diagram illustrating an example of a screen presentation in a case of automatically presenting alteration candidates according to the present embodiment. In the illustrated example, on a screen 1600 displayed as a pop-up when the minutes on foot input field is selected, an alteration candidate for altering the range of the minutes on foot and alteration candidates for altering the granularity (such as altering "minutes on foot" to "minutes by car" or "minutes on bicycle", or to a non-numerical expression (such as far or near, for example)) are proposed. Note that a "Present alteration candidates" button (not illustrated) may be displayed next to each input field, and the screen 1600 of alteration candidates for the corresponding information may be displayed when such a button is pressed.

FIG. 14 is a diagram illustrating an example of a screen presentation in which an anonymity level score is displayed for each item of property information. In illustrated example, on a screen 1700, there is displayed detailed information 1701 about a property, and anonymity level score information 1706 for each item of property information (herein, as an example, using the anonymity level (logarithm of the number (x) of properties matching the condition) computed using the anonymity level computation method in (b) above). With this arrangement, the seller-side user is able to grasp and adjust the anonymity level for each item of the property information.

FIG. 15 is a diagram illustrating an example of a screen presentation in which an anonymity level of the number of matching properties is displayed for each item of property information. In illustrated example, on a screen 1800, there is displayed detailed information 1801 about a property, and anonymity level information 1806 for each item of property information (herein, as an example, using the number of properties matching the disclosed property information computed according to the anonymity level computation method in (a) above). In the anonymity level information 1806, first, the anonymity level of place-related items (specifically, items such as the location, apartment name, and room number) is displayed, and the anonymity levels of items related to conditions (specifically, items such as the exclusively-owned area, the layout, the age of the building, the minutes on foot, and the floor number) are displayed under the limit of the place-related items. For example, in the case in which the anonymity level of the place-related items is "5,409 properties", the anonymity level of the exclusively-owned area is displayed as "436/5,409 properties", the anonymity level of the layout as "1,097/5,409 properties", the anonymity level of the age of the building as "426/5,409 properties", the anonymity level of the minutes on foot as "2,410/5,409 properties", and the anonymity level of the floor number as "661/5,409 properties". With this arrangement, the seller-side user is able to grasp and adjust the anonymity levels of items related to conditions on the property information for each item, under the limit of place-related items.

FIG. 16 is a diagram illustrating an example of a screen presentation in which the degree of contribution to the contract price is displayed for each item of property information, in the illustrated example, on a screen 1900, there is displayed detailed information 1901 about a property, and contribution degree information 1906 about the degree of contribution to the contract price by each item of the property information. The degree of contribution to the contract price is computed by the contribution degree computation unit 3305 included in the processing unit 330 of the server 300. The contribution degree computation unit 3305 computes the degree of contribution to the contract price of the disclosed property information by each item of the property information, and outputs to the information presentation unit 3309.

The information presentation unit 3309 presents the degree of contribution by each item of the property information, as illustrated by the contribution degree information 1906 on the screen 1900. The seller-side user is able to refer to such degrees of contribution to adjust the anonymity level for each item of the property information. More specifically, for items with a large degree of contribution, an increase in the anonymity level greatly affects the drop in the contract price, and thus the user adjusts the anonymity level not to be too high. Whereas for items with a small degree of contribution, an increase in the anonymity level does not greatly affect the drop in the contract price, and thus the user adjusts the anonymity level to be higher. Hereinafter, an example will be described with reference to FIG. 17.

FIG. 17 is a diagram illustrating an example of a screen presentation in a case in which a user manually alters property information in consideration of the degree of contribution to the contract price. In the illustrated example, on a screen 2000, there is displayed detailed information 2001 about a property, the information having been altered in consideration of the degree of contribution to the contract price, and contribution degree information 2006 about the degree of contribution to the contract price by each item of the property information. The detailed information 2001 illustrated in the diagram is an alteration by the user of the detailed information 1901 in FIG. 16 in consideration of the degree of contribution to the contract price. Herein, as an example, the user has made adjustments to reduce the anonymization of items having a large degree of contribution to the contract price (for example, the location "9.1", the exclusively-owned area "9.4", and the age of the building "7.4"). For example, by making adjustments to reduce the anonymization, such as altering the location "000-555 4-Chome" to "4-Chome", altering, the exclusively-owned area "37.1 m$^2$" to "36 m$^2$ to 39 m$^2$", and the age of the building "15 years" to "14 years to 16 years", it becomes possible to avoid a large drop in the contract price. On the other hand, adjustments are made to increase the anonymization of items having a small, degree of contribution to the contract price (for example, the apartment name "3.7", the room number "2.8", the minutes on foot "5.2", and the floor number "2.7"). For example, property information having little effect on the contract price can be adjusted to increase anonymization, such as by biding the apartment name and the room number, altering the minutes on foot "3 minutes" to "7 minutes or less", and altering the floor number "11th floor" to "3rd floor to 30th floor". The alteration of property information in consideration of the degree of contribution to the contract price is not limited to manual alteration by the user, and the system side may also conduct an anonymization process as illustrated in FIG. 17 automatically to improve the anonymity level while minimizing a drop in the predicted value as much as possible, using an evaluation formula as indicated in Formula 1 above.

In this way, the user is able to make adjustments to raise the anonymization of items having a small degree of contribution, in consideration of the degree of contribution to the contract price by each item of the property information. Note that although the examples illustrated in FIGS. 16 and 17 illustrate examples of presentation screens that display the "degree of contribution to the contract price", the present embodiment is not limited thereto, and may also display the "degree of contribution to the contract probability" by each item of the property information computed by the contribution degree computation unit 3305. In this case, the user likewise is able to adjust the anonymization of each item, in consideration of the degree of contribution to the contract probability by each item of the property information.

In addition, the information presentation unit 3309 may also cause a screen presenting all of the anonymity level, the degree of contribution to the contract price, and the degree of contribution to the contract probability for each item of the property information described above to be displayed on a display of the client 100.

Figure 18:
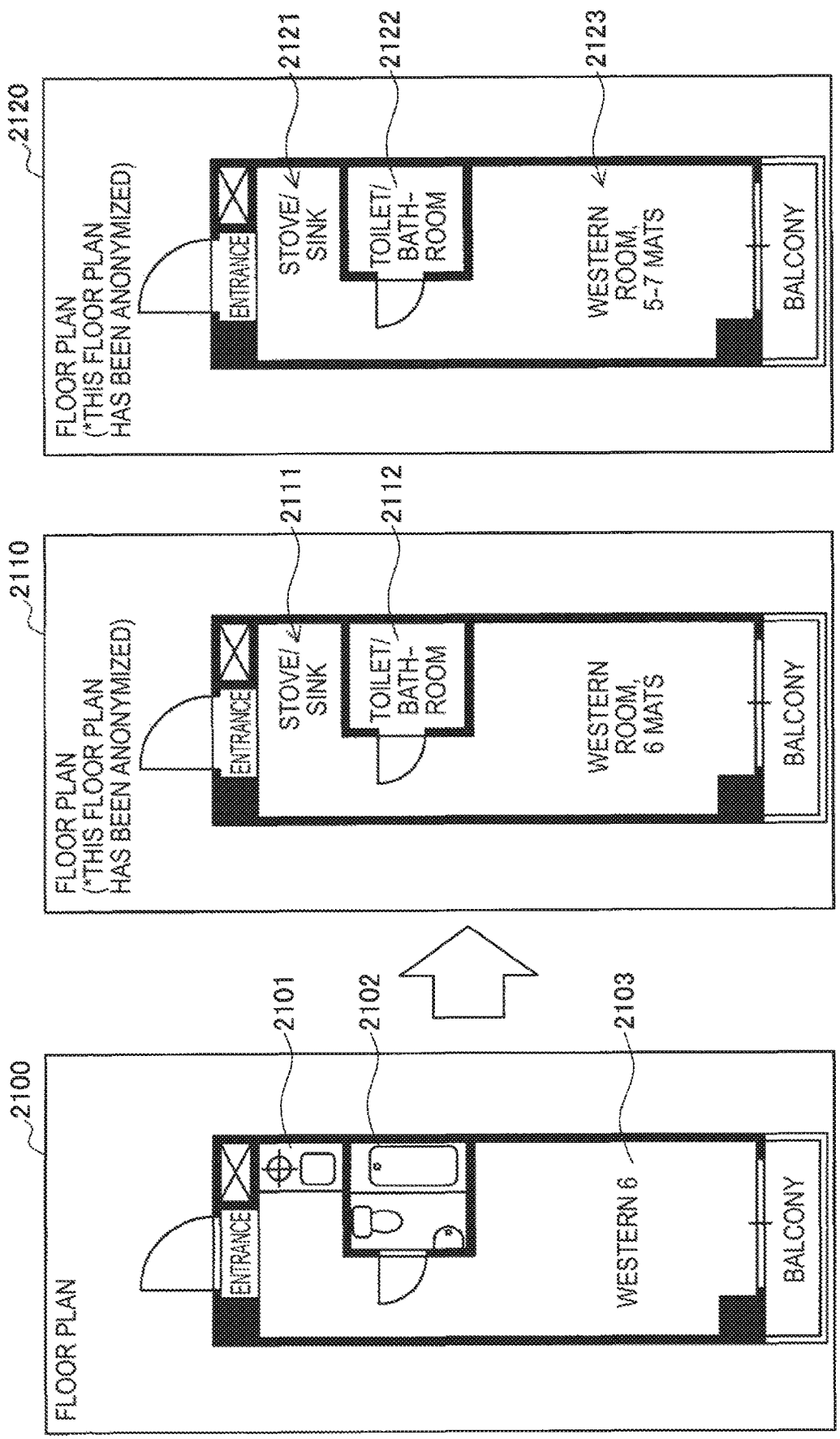
FIG. 18 is a diagram explaining an example of the anonymization of a floor plan according to the present embodiment.

FIG. 18 is a diagram explaining an example of the anonymization of a floor plan. Even if a floor plan is included in the property information disclosed to the buyer-side user, as described above, the disclosed information alteration unit 3302 is capable of altering the floor plan to a different floor plan, that many people would consider the same. The altered floor plan may be a preregistered image, or may be generated by the disclosed information alteration unit 3302. In the illustrated example, a floor plan 2100 is altered to a simplified floor plan 2110, or to a simplified and obfuscated floor plan 2120. Specifically, in the floor plan 2110, a stove/sink image 2101 is altered to a "stove/sink" text display 2111, while a toilet/bathroom image 2102 is altered to a "toilet/bathroom" text display 2112. By converting parts of the floor plan to text in this way, identification of the property from the floor plan can be avoided, and the property can be anonymized.

Also, in the floor plan 2120, similarly to the floor plan 2110, the stove/sink image 2101 is altered to a "stove/sink" text display 2121, while the toilet/bathroom image 2102 is altered to a "toilet/bathroom" text display 2122. Furthermore, the "Western room, 6 mats" text display 2103 on the floor plan 2100 is altered to a "Western room, 5-7 mats" text display 2123. In this way, by giving a range to obfuscate the layout information included in the floor plan, identification of the property from the floor plan can be avoided, and the property can be anonymized.

Also, as illustrated in the floor plan 2110 and the floor plan 2120, when presenting, an anonymized floor plan image, a comment display such as "This floor plan has been anonymized" may be displayed jointly.

Figure 19:
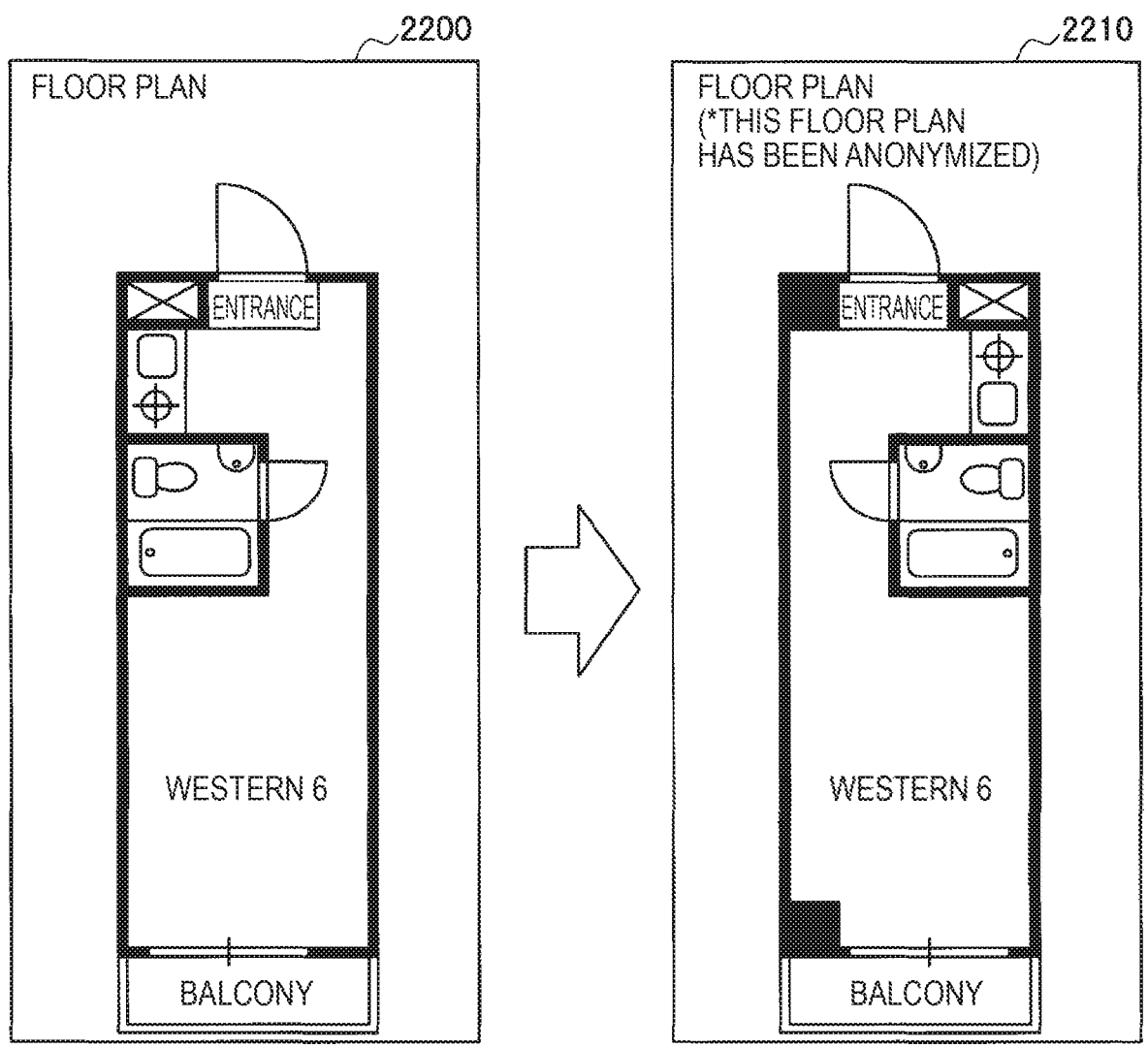
FIG. 19 is a diagram explaining another example of the anonymization of a floor plan according to the present embodiment.

FIG. 19 is a diagram explaining another example of the anonymization of a floor plan. In the illustrated example, anonymization is realized by altering a floor plan 2200 to a floor plan 2210 of another property of nearly equal value.

Figure 20:
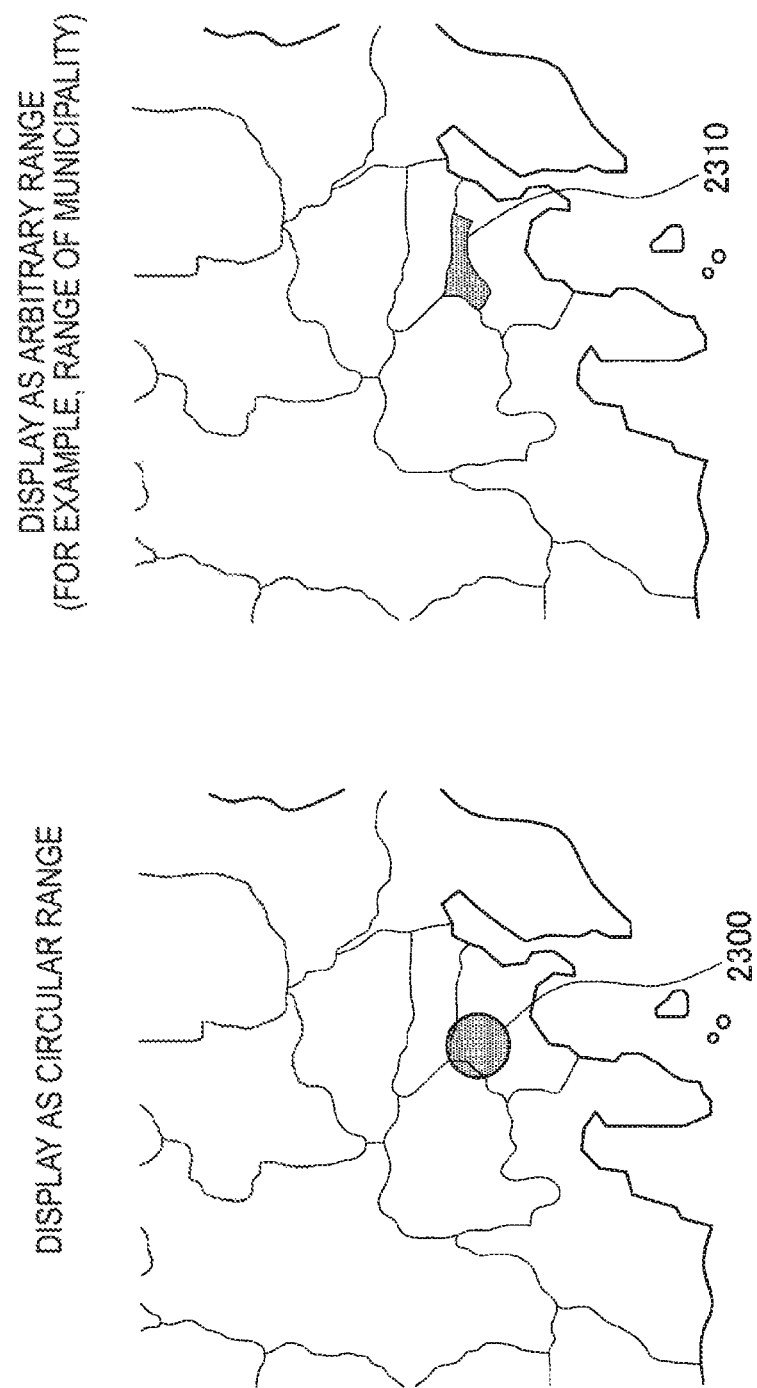
FIG. 20 is a diagram illustrating an example of a presentation screen of a location range according to the present embodiment.

FIG. 20 is a diagram illustrating an example of a presentation screen of a location range. The location information of a property that is presented to the buyer side user is not limited to being a text string of the location as illustrated in the detailed information 1201 in FIG. 6, and may also be presented as a map image as illustrated in FIG. 20. The location of a property may be displayed as a circular range (region 2300), as illustrated on the tell side of FIG. 20, or may be displayed as an arbitrary range (for example, a region 2310 indicating the range of a municipality), as illustrated on the right side of FIG. 20.

<<5. Hardware Configuration>>

Figure 21:
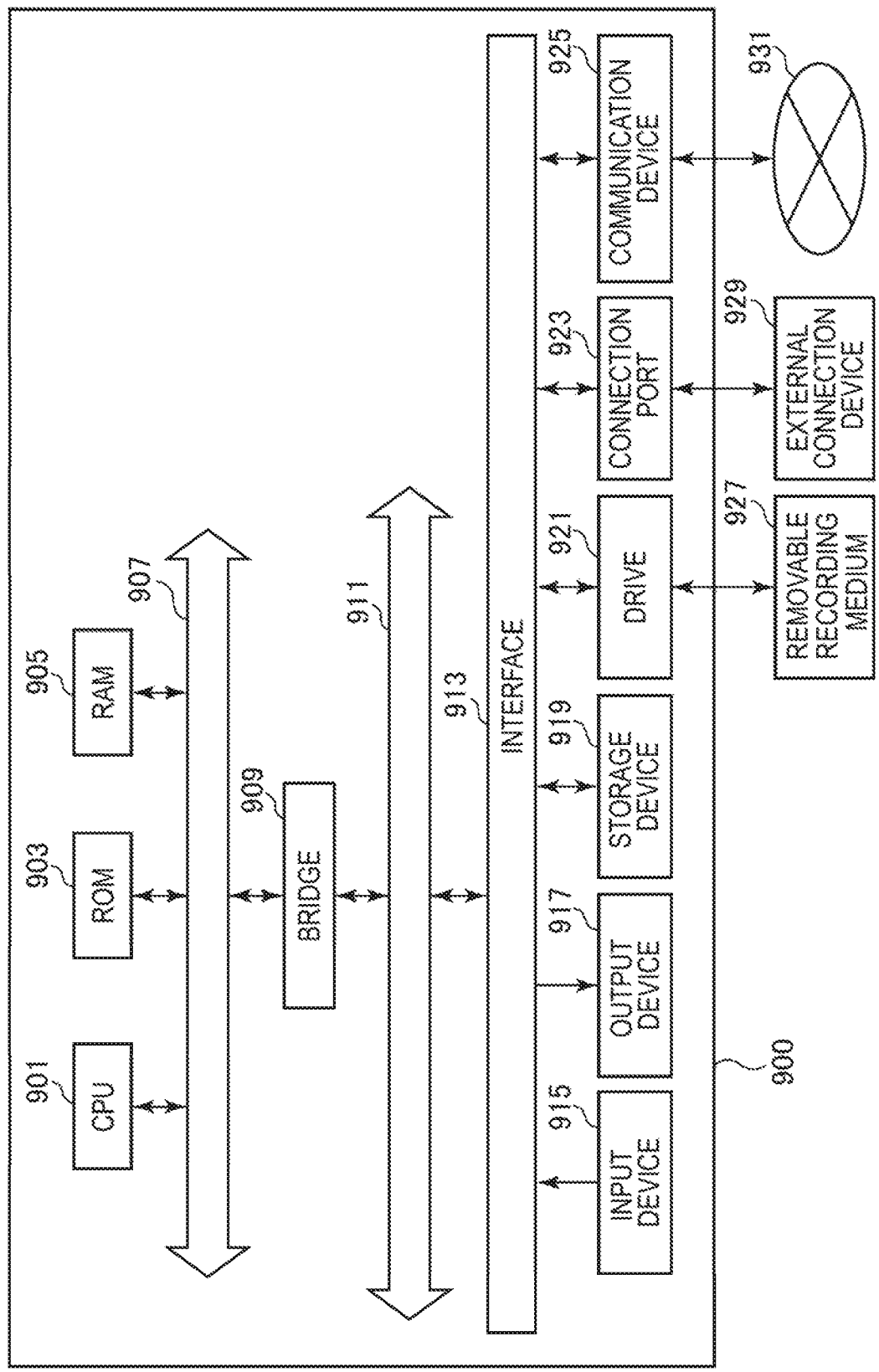
FIG. 21 is a block diagram illustrating an example hardware configuration of an information processing device according to an embodiment of the present disclosure.

Next, with reference to FIG. 21, a hardware configuration of an information processing device according to en embodiment of the present disclosure is described. FIG. 21 is a block diagram illustrating a hardware configuration example of the information processing device according to the embodiment of the present disclosure. An illustrated information processing device 900 may achieve the server 300 or the client 100 in the above described embodiment.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. The information processing device 900 may include a processing circuit such as a digital signal processor (DSP), an application-specific integrated circuit (ASIC), or a field-programmable gate array (FPGA), instead of or in addition to the CPU 901.

The CPU 901 functions as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component interconnect/Interface (PCI) bus via the bridge 909.

The input device 915 is a device operated by a user such as a mouse, a keyboard, a touchscreen, a button, a switch, and a lever. The input device 915 may be a remote control device that uses, for example, infrared radiation and another type of radio waves. Alternatively, the input device 915 may be an external connection device 929 such as a mobile phone'that corresponds to an operation of the information procession device 900. The input device 915 includes an input control circuit that generates input signals on the basis of information which is input by a user to output the generated input signals to the CPU 901. The user inputs various types of data and indicates a processing, operation to the information processing device 900 by operating the input device 915.

The output device 917 is realized by a device capable of notifying the user of acquired information using senses such as vision, hearing, and touch. The output device 917 may be a display device such as a liquid crystal display (LCD) or an organic electro-luminescence (EL) display, an audio output device such as one or more speakers or headphones, or a device such as a vibrator. The output device 917 outputs results obtained from processing by the information processing device 900 in the form of visual information such as text or an image, in the form of audio such as speech or sound, or in the form of vibration or the like.

The storage device 919 is a device for data storage that is an example of a storage unit of the information processing device 900. The storage device 919 includes, for example, a magnetic storage device such as a hard disk drive (HDD), a semiconductor storage device, an optical storage device, or a magneto-optical storage device The storage device 919 stores therein the programs and various data executed by the CPU 901, and various data acquired from an outside.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. The drive 921 writes the record into the mounted removable recording medium 927.

The connection port 923 is a port used to connect devices to the information processing device 900. The connection port 923 may be a Universal Serial Bus (USB port, an IEEE1394 port, or a Small Computer System Interface (SCSI) port, for example. The connection port 923 may also be an RS-232C port, an optical audio terminal, a High-Definition Multimedia interface (HDMI (registered trademark)) port, and so on. The connection of the external connection device 929 to the connection port 923 makes it possible to exchange various kinds of data between the information processing device 900 and the external connection device 929.

The communication device 925 is a communication interface including, for example, a communication device for connection to a communication network 931. The communication device 925 may be a communication card for, for example, a local area network (LAN), Bluetooth (registered trademark), Wi-Fi, or a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 is, for example, the Internet, a home LAN, infrared communication, radio wave communication, or satellite communication.

The example of the hardware configuration of the information processing device 900 has been described. Each of the structural elements described above may be configured by using a general purpose component or may be configured by hardware specialized for the function of each of the structural elements. The configuration may be altered as necessary in accordance with the state of the art at the time of working of the present disclosure.

<<6. Supplemental Remarks>>

The above thus describes a disclosed information alteration process and examples of disclosed information presentation screens when a seller-side user (seller) sets disclosed real estate information about a property. Over the course of a real estate transaction, ultimately it becomes necessary to present non-anonymized property information to a buyer candidate, and thus an information presentation confirmation screen may also be presented to enable the seller to allow presentation in response to a property information presentation request from a buyer candidate.

On the information presentation confirmation screen, there is displayed a screen for selecting whether or not to present original property information (that is, non-anonymized property information) to a buyer candidate, as well as information such as "attributes of the buyer candidate", "contact information for the buyer candidate", "link to web page stating information about the buyer candidate", and "trust level score of the buyer candidate", for example. Attributes of the buyer candidate include an ID in the system, a nickname in the system, a name, gender, date of birth, nationality age, address, occupation, income, assets, family structure, a photograph, and the like, for example. Contact information for the buyer candidate includes a phone number, an email address, and the like, for example. A web page stating information about the buyer candidate is a page from any of various types of social networking services (SNS), such as a microblogging site or a blog site, for example.

The trust level score of a buyer candidate may be computed be the processing unit 330 of the server 300, using the attributes of the buyer candidate, the contents of a web page stating information about the buyer candidate, or an activity log (website log) as information serving as the basis for calculation, for example. For example, the processing unit 330 converts the above information serving as the basis for calculation into features, computes a "probability of actually reaching a contract", a "bad activity probability", or the like by a predictor learned by utilizing a contact log or the like, and converts the probability to a trust level. The bad activity probability refers to a probability of engaging in problematic activity, such as leaking information about the seller.

Note that the information presentation confirmation screen may or may not include all of the components (specifically, the "attributes of the buyer candidate", "contact information for the buyer candidate", "link to web page stating information about the buyer candidate", and "trust level score of the buyer candidate") for each item described above. It is sufficient for at least one component to be displayed for all items.

<<7. Conclusion>>

The embodiments of the present disclosure may include, for example, the above-described information processing apparatus (a server or a client), system, an information processing method executed by the information processing apparatus or the system, a program for causing the information processing device to exhibit its function, and a non-transitory tangible medium having the program stored therein.

The preferred embodiment(s) of the present disclosure has/have been described above with reference to the accompanying drawings, whilst the present technology is not limited to the above examples. A person skilled in the art may find various alterations and modifications within the scope of the appended claims, and it should be understood that they will naturally come under the technical scope of the present disclosure.

For example, in the foregoing embodiment, the anonymity level, contract price, contract probability, and degree of contribution to the contract price or the contract probability are described as examples of an "evaluation value", but the present embodiment is not limited thereto, and the "expectation that the property will be found in a search (or, the ratio of the change before and after the granularity alteration)", the "expectation that the property information will be referenced (or the ratio of the change before and after the granularity alteration)", or the "expectation that a query will be made (or the ratio of the change before and after the granularity alteration)" may also be used as an evaluation value.

More specifically, the "expectation that the property will be found in a search" includes (1) the probability of the property being found in a search, (2) the number of search hits in a certain period, or (3) a symbolic representation of the number of search hits in a certain period. "(1) The probability of the property being found in a search" is the probability of the relevant property being found in an arbitrary search query. Such a probability may be computed on the basis of a search log. The search log saves the conditions (such as location, layout, and exclusively-owned area) for each property in the case in which a search is performed. Note that the search log may also be generated by browsing a property information site, for example. For example, in a case in which a map of the entire country is displayed on an initial screen, "Tokyo" is selected first, then "Shinjuku-ku" is selected, and detailed information about a certain property displayed next is referenced, a log up to the first referencing of property information may be treated collectively as a log of a search for "Shinjuku-ku, Tokyo". By calculating the ratio by which such a search log matches disclosed property information, the probability of the property being found in a search is computed. Also, in the case of treating the ratio of changes an evaluation value, the evaluation value may be computed as a ratio of the number of times the original, non-anonymized property information matches the search log versus the number of times the anonymized property information matches the search log.

"(2) The number of search hits in a certain period" is the number of times the relevant property is found in a search over a certain period (such as one day, one week, or one month, for example). Such a number may be computed by multiplying: the above probability that the property will be found in a search by a predicted number of the total number of search queries in a certain period. The total number of search queries is predictable from the number of search queries in the last previous period of similar conditions, for example. For example, the total number of search queries from June 14th (Sun) to 20th (Sat) in 2015 is predicted from the number of search queries from the previous week of June 7th (Sun) to 13th (Sat) in 2015, or from the previous year of June 15th (Sun) to 21st (Sat) in 2014. Also, in the case of making a prediction from the previous year, the ratio of the number of queries from June 8th (Sun) to 14th (Sat) in 2014 and from June 7th (Sun) to 13th (Sat) in 2015 may also be used as a correction to reflect the change in the overall number of queries.

"(3) A symbolic representation of the number of searches in a certain period" may be generated on the basis of rules, such as setting "Few" in the case in which the number of search hits is predicted to be 10 or less in one week, "Moderate" in the case in which the number of search hits is predicted to be more than 10 but less than 50 in one week, and "Many" in the case in which the number of search hits is predicted to be 50 or more in one week, for example.

Also, "the ratio of the change before and after the granularity alteration" indicates how much more difficult it is to find the anonymized disclosed property information in a search compared to the original disclosed property information. The above (1) and (2) are values indicating what degree of change occurred between before and after the anonymization process (for example, 50% if the predicted number of search hits in (2) is halved).

In addition, the "expectation that the property information will be referenced" and the "expectation that a query (such as a preview or an offer) will be made" may be computed from the "expectation that the properly will be found in a search" described above. In other words, since a typical flow of users on a property information site is "search", then "reference", and then "query", by preparing parameters indicating what ratio of users will abandon the search at each transition (abandonment rate), the "expectation that the property information will be referenced" and the "expectation that a query (such as a preview or an offer) will be made" are computable from the "expectation that the property will be found in a search". For example, by preparing the two parameters of "abandonment rate in the flow from search to reference" and "abandonment rate in the flow from reference to query", "expectation that the property information will be referenced"="expectation that the property will be found in a search"×"abandonment rate in the flow from search to reference", and "expectation that a query (such as a preview or an offer) will be made"="expectation that the property will be found in a search"×"abandonment rate in the flow from reference to query"

can be computed.

Also the "abandonment rate in the flow from search to reference" and the "abandonment rate in the flow from reference to query" may be set by a person on the basis of know-how, or may be computed on the basis of an access log. Additionally, the "abandonment rate in the flow from search to reference" and the "abandonment rate in the flow from reference to query" may be prepared per each type of property. For example, by preparing different rates depending on location, it becomes possible to model differences in user activity according to place. Also, by preparing different rates depending on property features, such as whether or not the property is a corner room, it becomes possible to model differences depending on features, such as a search being more likely to result in a query if a property having a rare feature is found, and a search being less likely to result in a query it a property having typical features is found.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally; the present technology may also be configured as below.

(1)

An information processing device including:

an alteration unit that alters a granularity of real estate information to be disclosed, in accordance with a supplier-side privacy disclosure level pertaining to a real estate transaction; and a decision unit that decides an evaluation value of real estate information altered by the alteration unit.

(2)

The information processing device according to (1), in which the decision unit predicts a contract price of a property specified by the alter real estate information as the evaluation value.

(3)

The information processing device according to (2), in which the contract price is predicted on a basis of a number of supplied properties specified by the altered real estate information, or contract case data.

(4)

The information processing device according to any one of (1) to (3), in which the decision unit predicts a contract probability in a certain period as the evaluation value.

(5)

The information processing device according to (4), in which the contract probability is predicted on a basis of a recipient-side search history, a number of supplied properties specified by the altered real estate information, or contract case data.

(6)

The information processing device according to any one of (1) to (5), further including:

a setting unit that sets the privacy disclosure level.

(7)

The information processing device according to (6), in which the setting unit sets the privacy disclosure level in accordance with a certain value or an instruction from a supplier.

(8)

The information processing device according to any one of (1) to (7), in which, the alteration unit alters the granularity of the real estate information to maximize at least one of a contract price, a contract probability, and a degree of contribution to the contract price or the contract probability, while keeping the privacy disclosure level near a fixed level.

(9)

The information processing device according to any one of (1) to (8), which the alteration unit alters the granularity of the real estate information in accordance with an instruction from a supplier.

(10)

The information processing device according to (6) or (7), in which the setting unit computes an anonymity level of the real estate information altered in accordance with an instruction from a supplier.

(11)

The information processing device according to any one of (1) to (10), in which the decision unit computes, as the evaluation value, at least one from among a degree of contribution to a contract price or a contract probability by each item of the altered real estate information, the privacy disclosure level, an expectation of a property being found in a search, and a ratio of change in the expectation of being found in a search.

(12)

The information processing device according to any one of (1) to (11), further including:

an information presentation unit that controls a presentation, to the supplier side, of the altered real estate information together with the decided evaluation value.

(13)

The information processing device according to (12), in which the presented evaluation value includes at least one of the privacy disclosure level, a contract price, a contract probability, a degree, of contribution to the contract price or the contract probability by each item of the real estate information, an expectation of a property being found in a search or a ratio of change before and after the granularity alteration, an expectation of property information being referenced or a ratio of change before and after the granularity alteration, and an expectation of a query being made or a ratio of change before and after the granularity alteration.

(14)

An information processing method, executed by a processor, including:

altering a granularity of real estate information to be disclosed, in accordance with a supplier-side privacy disclosure level pertaining to a real estate transaction; and deciding an evaluation value of the altered real estate information.

(15)

A program causing a computer to function as:

an alteration unit that alters a granularity of real estate information to be disclosed, in accordance with a supplier-side privacy disclosure level pertaining to a real estate transaction; and a decision unit that decides an evaluation value of real estate information altered by the alteration unit.

REFERENCE SIGNS LIST

10 system
100 client
200 network
300 server
310 database
3101 property data
3103 selling data
3105 transaction history data
3107 surrounding environment data
320 communication unit
330 processing unit
3301 anonymity level setting unit
3302 disclosed information alteration unit
3303 contract probability prediction unit
3304 contract price prediction unit
3305 contribution degree computation unit
3309 information presentation unit

The invention claimed is:

1. An information processing system comprising:

a supplier terminal at a supplier-side of the information processing system, the supplier terminal including:

input circuitry that receives, from a property supplier, supplier-side real estate input information for a real estate and supplier-side anonymity input information, wherein the supplier-side anonymity input information is to be received from the property supplier via a supplier-side display screen instance at the supplier terminal, wherein the supplier-side display screen instance at the supplier terminal includes a presented anonymity user interface input element;

a server, remote from the supplier terminal operatively coupled to the supplier terminal via an electronic communication network, the server receiving the supplier-side real estate input information for the real estate and the supplier-side anonymity input information from the supplier terminal, and the server including:

memory that stores transaction history data of a plurality of buyer-side users;

a processing unit that determines a trust level of each of multiple ones of the plurality of buyer-side users based on buyer-side user activity information obtained by referencing the stored transaction history data associated with said multiple buyer-side users having viewed at least a portion of the supplier-side real estate input information;

a disclosed information alteration processing unit configured to, in response to said multiple buyer-side users viewing said at least the portion of the supplier-side real estate input information. alter a granularity of the supplier-side real estate input information to be respectively disclosed to each said multiple ones of the buyer-side users in accordance with the supplier-side anonymity input information associated with a supplier-side privacy disclosure level and the determined trust level of each said multiple buyer-side users having viewed said at least the portion of the supplier-side real estate input information, to produce privacy-level output presentation information, the privacy-level output presentation information being different, in at least one respect, from said at least the portion of the supplier-side real estate input information viewed by said multiple buyer-side users, and the privacy-level output presentation information being different between said multiple buyer-side users in accordance with the trust level of each of said multiple buyer-side users:

a contract probability processing unit and a contribution degree computation processing unit and a contract price processing unit that are configured to decide an evaluation value of the real estate based on the supplier-side privacy disclosure level; and an information presentation processing unit configured to output the privacy-level output presentation information to cause a display associated with each said buyer-side user to present the privacy-level output presentation information after having previously output said at least the portion of the supplier-side real estate input information for display on the display, wherein the contract probability processing unit and the contribution degree computation processing unit and the contract price processing unit are further configured to compute, as the evaluation value, at least one from among: a degree of contribution to a contract price and a contract probability by each item of altered supplier-side real estate input information, wherein the presented anonymity user interface input element includes an input to adjust privacy associated with the supplier-side real estate input information based on the computed degree of contribution to the contract price and/or the contract probability by each item of altered supplier-side real estate input information for the evaluation value, and wherein the information presentation processing unit is configured to change the privacy-level output presentation information, in real time, responsive to an input to the presented anonymity user interface input element to change an anonymity level of the supplier-side anonymity input information, the changing including removing or adding from the display, in real time, the supplier-side real estate input information for one or more categories of the disclosed property information responsive to the input to the presented anonymity user interface input element to change the anonymity level of the supplier-side anonymity input information.

2. The information processing system according to claim 1, wherein
the contract probability processing unit and the contribution degree computation processing unit and the contract price processing unit are further configured to predict the contract price as the evaluation value.

3. The information processing system according to claim 2, wherein
the contract price is predicted on a basis of a number of supplied properties specified by the supplier-side anonymity input information.

4. The information processing system according to claim 1, wherein
the contract probability processing unit and the contribution degree computation processing unit and the contract price processing unit are further configured to predict the contract probability of a certain period as the evaluation value.

5. The information processing system according to claim 4, wherein
the contract probability is predicted on a basis of a recipient-side search history and a number of supplied properties specified by the supplier-side anonymity input information.

6. The information processing system according to claim 1, further comprising:
an anonymity level setting processing unit configured to set a system default supplier-side privacy disclosure level as the supplier-side privacy disclosure level, when the supplier-side anonymity input information was not received.

7. The information processing system according to claim 6, wherein the anonymity level setting processing unit is further configured to compute an updated anonymity level in accordance with an updated supplier-side anonymity input information.

8. The information processing system according to claim 1, wherein
the disclosed information alteration processing unit is further configured to alter the granularity of the supplier-side real estate input information to maximize at least one of the contract price, the contract probability, and the degree of contribution to the contract price or the contract probability, while keeping the supplier-side privacy disclosure level at or within a predetermined amount from a fixed level.

9. The information processing system according to claim 1, wherein
the disclosed information alteration processing unit is further configured to alter the granularity of the supplier-side real estate input information in accordance with a further input from the property supplier.

10. The information processing system according to claim 1, wherein
the contract probability processing unit and the contribution degree computation processing unit and the contract price processing unit are further configured to compute, as the evaluation value, at least one from among: the supplier-side privacy disclosure level, an expectation of a property being found in a search, and a ratio of change in the expectation of being found in the search.

11. The information processing system according to claim 1, wherein the privacy-level output presentation information is provided over an Internet-based network as the electronic communications network to a processor associated with the display associated with each of said multiple buyer-side users.

12. The information processing system according to claim 11, wherein
the presented evaluation value includes at least one of: the supplier-side privacy disclosure level, the contract price, the contract probability, the degree of contribution to the contract price or the contract probability by each item of the altered supplier-side real estate information, an expectation of a property being found in a search or a ratio of chance before and after the granularity alteration, an expectation of property information being referenced or the ratio of chance before and after the granularity alteration, and an expectation of a query being made or the ratio of change before and after the granularity alteration.

13. The information processing system according to claim 1, wherein the presented anonymity user interface input element includes an anonymity level adjustment button.

14. The information processing system according to claim 1, wherein the presented anonymity user interface input element includes any of:
number of matching properties anonymity level input adjustment text field;
an anonymity level adjustment button;
a pop-up including proposed alteration candidates adjustment selection boxes;
anonymity level per property item adjustment text field;
anonymity level per property item range adjustment text field; or
degree of contribution to contract price adjustment text field.

15. The information processing system according to claim 1,
wherein the disclosed information alteration processing unit is configured to specify a granularity alteration pattern that optimizes combinations based on an electronic data structure that treats the property information as vertices and alterations in the granularity with respect to the property information as edges and select a candidate having a minimum decline in a predicted value of the contract price or the contract probability for each certain period from among granularity alteration patterns that satisfy the supplier-side anonymity input information, and
wherein said altering the granularity of the supplier-side real estate input information to be disclosed includes automatically applying, using the disclosed information alteration processing unit, a correction so as not to bias an item of the supplier-side anonymity input information that has already been anonymized from a prior anonymization process during a prior altering the granularity of the supplier-side real estate input information to be disclosed operation.

16. An information processing method comprising:
receiving, via an electronic communications network and input circuitry, from a property supplier, supplier-side real estate input information for a real estate and supplier-side anonymity input information, wherein the supplier-side anonymity input information is configured to be received from the property supplier via a supplier-side display screen instance at a supplier terminal, wherein the supplier-side display screen instance at the supplier terminal includes a presented anonymity user interface input element
determining, via a processing unit, a trust level of each of a plurality of buyer-side users based on buyer-side user activity information obtained by referencing transaction history data of each of the plurality of buyer-side users having accessed at least a portion of the supplier-side real estate input information and based on attributes of the plurality of buyer-side users;
altering, via a disclosed information alteration processing unit, a granularity of the supplier-side real estate input information to be respectively disclosed to each of the plurality of buyer-side users in accordance with the supplier-side anonymity input information associated with a supplier-side privacy disclosure level and the determined trust level of each of the plurality of buyer-side users having accessed said at least the portion of the supplier-side real estate input information to produce privacy-level output presentation information, the privacy-level output presentation information being different in at least one respect, from said at least the portion of the supplier-side real estate input information having been previously output and the privacy-level output presentation information being different between the said multiple buyer-side users in accordance with the trust level of each of said multiple buyer-side users;
deciding, via a contract probability processing unit and a contribution degree computation processing unit and a contract price processing unit, an evaluation value of the real estate based on the supplier-side privacy disclosure level; and
outputting the privacy-level output presentation information, via an information presentation processing unit, to cause a display associated with each said buyer-side user to present the privacy-level output presentation information after having previously output said at least the portion of the supplier-side real estate input information for display on the display,
wherein said deciding the evaluation value further includes computing, as at least part of the evaluation value, a degree of contribution to a contract price and a contract probability by each item of altered supplier-side real estate input information,
wherein said causing the display to present the privacy-level output presentation information and the evaluation value includes providing the degree of contribution to the contract price and the contract probability by each item of altered supplier-side real estate input information for output by the presented anonymity user interface input element to adjust privacy associated with the supplier-side real estate input information,
wherein said causing the display to present the privacy-level output presentation information includes changing the privacy-level output presentation information, in real time, responsive to an input to the presented anonymity user interface input element to change an anonymity level of the supplier-side anonymity input information, and
wherein said changing includes transforming a format of the privacy-level output presentation information displayed on the display, in real time, responsive to the input to the presented anonymity user interface input element to change the anonymity level of the supplier-side anonymity input information.

17. The information processing method according to claim 16, wherein
said altering the granularity of the supplier-side real estate input information to be disclosed includes automatically applying, using the disclosed information alteration processing unit, a correction so as not to bias an item of the supplier-side anonymity input information that has already been anonymized from a prior anonymization process during a prior altering the granularity of the supplier-side real estate input information to be disclosed operation.

18. A computer program product including executable instructions stored on a non-transitory storage medium that when executed by a processor causes the processor to perform operations comprising:
receiving from a property supplier, supplier-side real estate input information for a real estate and supplier-side anonymity input information, wherein the supplier-side anonymity input information is configured to he received from the property supplier via a supplier-side display screen instance at a supplier terminal, wherein the supplier-side display screen instance at the supplier terminal includes a presented anonymity user interface input element;
receiving, over an Internet-based network, buyer-side user information for a plurality of buyer-side users;
determining a trust level of each of the plurality of buyer-side users based on the received buyer-side user information obtained by referencing transaction history data of the plurality of buyer-side users having accessed at least a portion of the supplier-side real estate input information;
based on the plurality of buyer-side users having electronically viewed said at least the portion of the supplier-side real estate input information, altering a granularity of the supplier-side real estate input information to be respectively disclosed to each of the buyer-side users in accordance with the supplier-side anonymity input information associated with a supplier-side privacy disclosure level and the determined trust level of each of the plurality of buyer-side users having been determined to have viewed said at least the portion of the supplier-side real estate input information, to produce privacy-level output presentation information, the privacy-level output presentation information being different between the said multiple buyer-side users in accordance wide the trust level of each of said multiple buyer-side users;

deciding an evaluation value of the real estate based on the supplier-side privacy disclosure level;

causing a display to present the privacy-level output presentation information and the evaluation value; and causing a second display to display the supplier-side real estate input information according to the altered granularity, according to the privacy-level output presentation information, after having previously output said at least the portion of the supplier-side real estate input information for display on the display, wherein said deciding the evaluation value further includes computing, as at least part of the evaluation value, at least one from among: a degree of contribution to a contract price and a contract probability by each item of altered supplier-side real estate input information, wherein said causing the display to present the privacy-level output presentation information and the evaluation value includes providing the degree of contribution to the contract price and/or the contract probability by each item of altered supplier-side real estate input information for output by the presented anonymity user interface input element, wherein said causing the display to present the privacy-level output presentation information includes changing the privacy-level output presentation information and the evaluation value, in real time, responsive to an input to the presented anonymity user interface input element to change an anonymity level of the supplier-side anonymity input information, and wherein said changing includes removing or adding from the display the supplier-side real estate input information for one or more categories of the disclosed property information responsive to the input to the presented anonymity user interface input element to change the anonymity level of the supplier-side anonymity input information.

19. The computer program product according to claim 18, wherein said altering the granularity of the supplier-side real estate input information to be disclosed includes automatically applying, using the disclosed information alteration processing unit, a correction so as not to bias an item of the supplier-side anonymity input information that has already been anonymized from a prior anonymization process during a prior altering the granularity of the supplier-side real estate input information to be disclosed operation.

* * * * *